(12) United States Patent
Tanaka et al.

(10) Patent No.: US 6,819,458 B1
(45) Date of Patent: Nov. 16, 2004

(54) GAMUT JUDGING APPARATUS, COLOR TRANSFORM APPARATUS AND GAMUT BOUNDARY LEARNING METHOD

(75) Inventors: Takehisa Tanaka, Kawasaki (JP); Osamu Yamada, Kawasaki (JP); Mutsuko Nichogi, Fuchu (JP); Katsuhiro Kanamori, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/540,997

(22) Filed: Mar. 31, 2000

(30) Foreign Application Priority Data

Apr. 8, 1999 (JP) ............................................ 11-101656

(51) Int. Cl.[7] .................................................. G03F 3/08
(52) U.S. Cl. ........................ 358/518; 382/162; 382/155; 358/520; 345/590
(58) Field of Search .................................. 358/518, 515, 358/520, 523, 525, 519, 521; 382/155, 156, 157, 159, 162, 167; 706/15, 16, 25; 345/590

(56) References Cited

U.S. PATENT DOCUMENTS

| | | | | |
|---|---|---|---|---|
| 4,675,704 A | | 6/1987 | Yamamoto | 346/160 |
| 5,237,409 A | * | 8/1993 | Yamaguchi | 348/391.1 |
| 5,875,260 A | * | 2/1999 | Ohta | 382/162 |
| 6,088,475 A | * | 7/2000 | Nagashima et al. | 382/162 |
| 6,198,843 B1 | * | 3/2001 | Nakauchi et al. | 382/167 |
| 6,229,915 B1 | * | 5/2001 | Ohkubo | 382/167 |
| 6,480,299 B1 | * | 11/2002 | Drakopoulos et al. | 358/1.9 |
| 6,560,356 B1 | * | 5/2003 | Takahashi et al. | 382/162 |
| 6,611,356 B1 | * | 8/2003 | Shimizu et al. | 358/1.9 |
| 2001/0017627 A1 | * | 8/2001 | Marsden et al. | 345/501 |

FOREIGN PATENT DOCUMENTS

JP             60105376        6/1985    ............ H04N/1/40

OTHER PUBLICATIONS

*Gamut Mapping on Munsell Color System*, Suzuki et al., Institute of Imaging Electronics Engineers of Japan Technical Meeting Proceedings 98–01–02, 1998. with a partial English language translation.
*Gamut Mapping Algorithms Based on Psychophysical Experiment*, Morovic et al., The Fifth Color Imaging Conference: Color Science, Systems, and Applications, 1998.
*Introduction to the Theory of Neural Computation*, Hertz et al., Addison Wesley, 1991, Chapter 6.1—Multi-Layer Networks: Back–Propagation, pp. 115–120.
*Algorithm of Pattern Recognition and Learning*, Uesaka et al., Bunichi Sougou Shuppan, 1991 (ISBN4–8299–2072–6), along with an English Language Translation of pp. 39–47.

* cited by examiner

*Primary Examiner*—Kimberly Williams
*Assistant Examiner*—Melanie M. Vida
(74) *Attorney, Agent, or Firm*—Greenblum & Berstein, P.L.C.

(57) ABSTRACT

A gamut judging apparatus of the present invention has source color distance calculator 1 that calculates the length of a source color vector connecting a source color as an object to judge whether the source color is in or out of gamut of a device and a center color set in the gamut, gamut distance calculator 3 that calculates a gamut distance between the center color and an intersection at which the source color vector or an extended source color vector intersects a gamut boundary of the device, and a judging section that judges that the source color is out of the gamut of the device when the length of the source color vector is larger than the gamut distance, and judges that the source color is in the gamut of the device when the length of the source color vector is smaller than the gamut distance.

9 Claims, 8 Drawing Sheets

GAMUT JUDGING APPARATUS, COLOR TRANSFORM APPARATUS AND GAMUT BOUNDARY LEARNING METHOD

BACKGROUND OF THE INVENTION

1. Field of the Invention

The present invention relates to a gamut judging apparatus, color transform apparatus and gamut boundary learning method.

2. Description of the Related Art

Devices that handle color images, for example, to input, process, print or display, such as a scanner, personal computer, color printer, color copy machine and monitor, have a limitation in a range of colors to handle. The range of colors that a device can handle is called gamut. Further, the color space of an input image expected in each device is usually different for each device.

Accordingly, handling the color image inside the devices and between the devices needs the color transform for transforming colors of the color image into colors in the gamut that the device can handle, and the color transform processing for transforming colors of the color image into respective amounts in the color space expected in the device. These transforms are called wide-sense color transform.

For example, when a color image input from a scanner is printed in a color copy machine, the gamut of the scanner is different from the gamut actually printed. Therefore, the color transform is needed.

Further, recently generalized operations are that a personal computer is connected to a scanner, monitor and color printer, and a color image input from the scanner is corrected in the monitor, and then is printed in the color printer. Such operations require the color transform between the devices connected thereto.

An example of the color transform from a monitor to a printer is explained. RGB that is an inherent color space of the monitor is once transformed into values in CIE L*a*b* space (hereinafter abbreviated to as Lab space) which does not depend on devices and is generally used. The values are further transformed into colors, reproducible by a printer, in the Lab space. Then, the result is transformed into CMYK that is an input signal for the printer.

At this time, the transform from RGB to the Lab space and the transform from the Lab space to CMYK are achieved by actually displaying or printing images with various RGB values and CMYK values, and based on the result obtained by the color measurement, determining a lookup table and coefficients for linear transform.

However, in the color transform for transforming colors of a monitor into those of a printer in the Lab space, since the gamut of the monitor and the gamut of the printer are largely different from each other, it is fundamentally impossible to reproduce correct colors, and is possible only to reproduce colors approximately.

Various algorithms have been proposed conventionally as the color transform method. An example is disclosed in Japanese Unexamined Patent Publication 60-105376.

The publication describes a color image output apparatus which transforms a color of a source device into a color corresponding to an intersection at which a segment connecting a color on the achromatic axis and a color of the source device intersects a gamut boundary of a target device, and thus performs the color transform when the color of the source device, in other words, a device as a source for the color transform is out of the gamut of the target device, in other words, a device as a target for the color transform.

Generally, to perform the color transform, it is necessary to judge whether a color is in or out of gamut(hereinafter abbreviated to as gamut judging). With respect to the forgoing, however, the publication discloses a method for holding colors in the gamut of each of all devices as a table. However, in the recent devices using RGB values generally each with 8 bits, since the data amount to be held is huge, such a method is not practical.

Further, performed in a document of Jan Morovic and M.Ronnier Luo, "Gamut Mapping Algorithms Based on Psychophysical Experiment", The Fifth Color Imaging Conference: Color Science, Systems, and Applications, 1998 is a comparison between various color transform methods including a method similar to that in JP60-105376. As the judgment whether a color is in or out of gamut, the document proposes a gamut judging method described in the following.

The Lab space is transformed into polar coordinate indication as follows:

$$r = \sqrt{(L-50)^2 + a^2 + b^2} \qquad \text{[Eq. 1]}$$

$$\alpha = \tan^{-1}\left(\frac{b}{a}\right) \qquad \text{[Eq. 2]}$$

$$\theta = \tan^{-1}\left(\frac{L-50}{\sqrt{a^2+b^2}}\right) \qquad \text{[Eq. 3]}$$

Then, the color space is divided into 16.times.16 areas with $\alpha$ and $\theta$. Next, a color on the gamut boundary in an input space of a target device is obtained, and the obtained color is transformed into the above-mentioned polar coordinate. Then, a color with maximum r is obtained for each of 16.times.16 areas.

To obtain the gamut boundary of a color, a straight line 1 connecting a given color to a center color (point at L=50 on the lightness axis) is calculated. Next, three colors with maximum r such that a triangle obtained by connecting the three colors with maximum r intersects the straight line 1 are selected. Then, the intersection at which the triangle comprised of the three colors intersects the straight line 1 is considered as the gamut boundary of the given color.

However, the gamut boundary of a device has a complicated shape, and further signals input to the device are usually quantized. Therefore, conventionally there has been no simple and accurate method for representing the gamut boundary.

Accordingly, there has been the problem conventionally that not only the color transform, but also the judgment of in-or-out-of-gamut requires large processing and time, or the judgment should be performed with a method with low accuracy.

Thereby, there has been further the problem that the color transform also requires large processing and time, and only achieved is the color transform with original gradation degraded.

SUMMARY OF THE INVENTION

An object of the present invention is to provide an apparatus that simply and accurately judges whether a given color is in or out of gamut of a device, i.e., gamut judgment, and the learning method therefor.

Further, using the gamut judgment that can be performed simply and accurately, another object of the present invention is to provide a color transform apparatus capable of transforming colors simply and excellently, and the learning method therefor.

The color transform apparatus of the present invention sets a center color in the gamut of a device, calculates a distance between the center color and a source color, further calculates a distance between the center color and an intersection at which a segment connecting the source color and the center color intersects a gamut boundary of the device, and judges that the source color is out of the gamut of the device when the former distance is larger than the latter distance, while judging that the source color is in the gamut of the device when the former distance is smaller than the latter distance.

Thus, judging whether the source color is in or out of the gamut of the device using the distance between the center color and source color enables the gamut judging apparatus that performs accurate judgment simply to be obtained.

Further, the gamut boundary learning method of the present invention selects a gamut boundary vector connecting the center color set inside the gamut of the device and a color considered to exist on the gamut boundary of the device, and learns the length of the gamut boundary vector using a direction cosine of the gamut boundary vector.

Thus, when a source color is given, the direction cosine for an arbitrary source color capable of being calculated is calculated, and using the direction cosine corresponding to the source color, it is possible to calculate a distance between the gamut boundary and the center color. Accordingly, it is possible to obtain the apparatus and learning method for simply and accurately judging whether the source color is in or out of the gamut.

Further, the color transform apparatus of the present invention calculates a distance between the center color and the gamut boundary of the source device in the source color vector direction, another distance between the center color and the gamut boundary of the target device in the source color vector direction, and obtains a target color corresponding to the source color vector from the calculated two distances.

Thus, it is possible to obtain the simplified excellent color transform apparatus with original gradation kept by obtaining a target color from the distance between the center color and the gamut boundary of the source device in the source color vector direction and the distance between the center color and the gamut boundary of the target device in the source color vector direction.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS (Embodiment 1)

Figure 1:
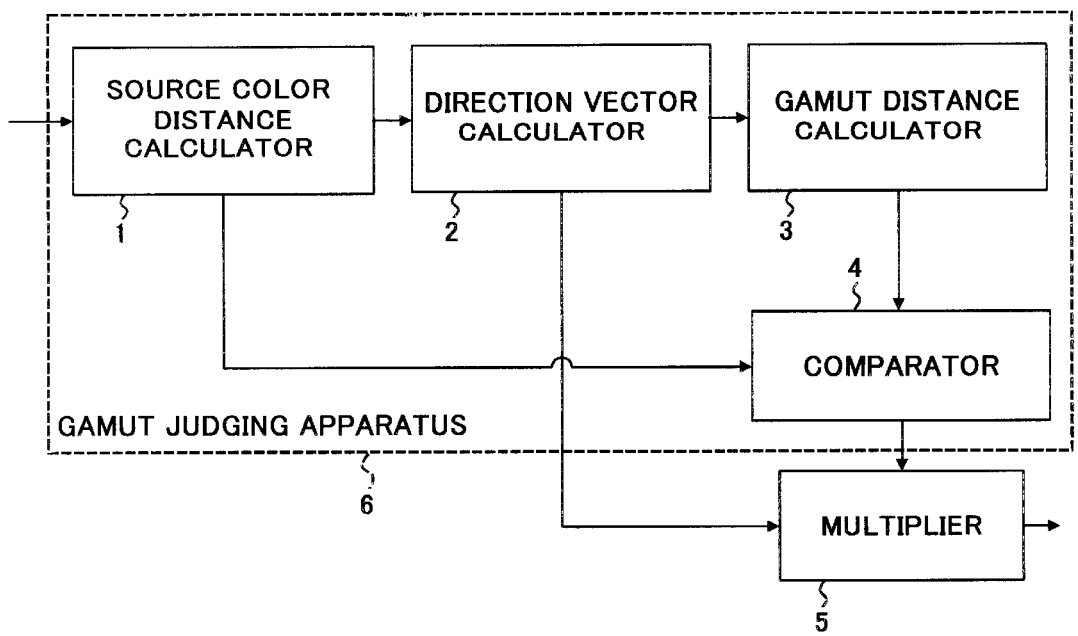
FIG. 1 is a block diagram illustrating a configuration of a color transform apparatus according to one embodiment of the present invention.

FIG. 1 is a block diagram illustrating a configuration of a color transform apparatus according to Embodiment 1 of the present invention.

The color transform from a monitor to a printer is assumed in Embodiment 1. In other words, the monitor is a source device, the printer is a target device, and a source color of the monitor is transformed into a target color of the printer.

It is further assumed in Embodiment 1 that a program (software) readable by a computer is stored in a recording medium such as a CD-ROM, downloaded in a RAM of a personal computer, and executed by a CPU of the personal computer, and thereby the CPU operates as a gamut judging apparatus and color transform apparatus.

In FIG. 1, source color distance calculator 1 calculates a length of a source color vector connecting a center color set in the gamut and a source color using an input source color, and outputs the source color vector and the length of the source color vector.

Directional vector calculator 2 calculates a direction cosine of the source color vector using the source color vector and the length of the source color vector input from source color distance calculator 1 to output.

Gamut distance calculator 3 calculates a gamut distance between the gamut boundary of the printer and the center color using the direction cosine of the source color vector input from direction cosine calculator 2. In addition, in Embodiment 1, gamut distance calculator 3 is comprised of a neural network.

Comparator 4 compares the length of the source color vector output from source color distance calculator 1 to the gamut distance output from gamut distance calculator 3. Then, when the length of the source color vector is larger than the gamut distance, comparator 4 judges that the source color is out of the gamut of the printer, and outputs the gamut distance. When length of the source color vector is smaller than the gamut distance, comparator 4 judges that the source color is in the gamut of the printer, and outputs the length of the source color vector.

Multiplier 5 multiplies the direction cosine of the source color vector output from direction cosine calculator 2 by an output from comparator 4, and outputs the resultant as the target color corresponding to the source color.

Thus, gamut judging apparatus 6 is comprised of source color distance calculator 1, direction cosine calculator 2, gamut distance calculator 3 and comparator 4.

The operation of the color transform apparatus according to Embodiment 1 is explained below.

The source color of the monitor is input to the color transform apparatus. Although a color of each pixel of a color image is represented with RGB values generally in a monitor, it is assumed that the RGB values are already transformed into Lab values in Lab space in advance before being input to the color transform apparatus according to Embodiment 1.

Further, in Embodiment 1, the center color has the Lab values of 50, 0, 0, in other words, is set at a midpoint between a white point and black point on the achromatic axis. The reason of such a setting is that setting the center color on the achromatic axis does not cause wide fluctuations in the distance between the center color and the gamut boundary because there are many cases that an achromatic color is considered to exist at almost the center of a cross section obtained by cutting the gamut of a device with the plane which has the same lightness. Thereby, the configuration of the gamut distance calculator is simplified.

Source color distance calculator 1 calculates the length Ds of the source color vector connecting the center color and source color from the input Lab values using the following equation 4:

$$D = \sqrt{(L-50)^2 + a^2 + b^2} \quad [\text{Eq. 4}]$$

Then, source color distance calculator 1 outputs the source color vector and Ds to direction cosine calculator 2 and comparator 4.

Next, direction cosine calculator 2 receives the source color vector and the length Ds from source color distance calculator 1, and calculates each element $S_L$, $S_a$ or $S_b$ of the direction cosine of the source color vector with the following equation 5, assuming D=Ds, to output to gamut distance calculator 3 and multiplier 5:

$$S_L = \frac{L-50}{D}, \quad S_a = \frac{a}{D}, \quad S_b = \frac{b}{D} \quad [\text{Eq. 5}]$$

Gamut distance calculator 3 calculates a gamut distance Dg, which is a distance between the center color and the gamut boundary, in the printer using each element $S_L$, $S_a$ or $S_b$ of the input direction cosine with the neural network to output to comparator 4.

In addition, the multi-layered perceptron is used for the neural network, and the back-propagation learning method is used for the setting of coefficient of the multi-layered perceptron. The method for calculating outputs in the multi-layered perceptron and the back-propagation learning method are described in, for example, "Algorithm of Pattern Recognition and Learning" by Yoshinori Uesaka and Kazuhiko Ozaki, published by Bunichi Sougou Shuppan, and the explanation thereof is omitted.

The method for learning the gamut boundary with the neural network is explained below.

It is assumed that input signals in the printer in Embodiment 1 have RGB values each with a value of 0 to 255 for each pixel. Then, pixel values are first generated such that each value of R, G or B is one of 0, 50, 100, 150, 200 and 255, and one of R, G and B is the minimum value or maximum value among the above values, in other words, 0 or 255.

The number of such pixel values existing is 152. Such points have the extremely high possibility of existing on the gamut boundary of the printer. Therefore, the use of such points for the gamut boundary learning of the printer enables the increased effectiveness.

Next, color patches corresponding to such pixel values are actually printed in the printer, and colors of the printed results are measured with a calorimeter to obtain the Lab values.

With respect to each value of total 152 Lab values, the distance Dg from the center color to the gamut boundary and each element $S_L$, $S_a$ or $S_b$ of the direction cosine are calculated with the equations 4 and 5 (assuming D=Dg).

Then, the multi-layered perceptron with $S_L$, $S_a$ or $S_b$ as inputs and Dg as an output is learned with the back-propagation learning method.

As described above, in the color transform apparatus in Embodiment 1, a color considered to exist on the gamut boundary of the printer is selected from colors corresponding to input signals having at least one element being the minimum value or maximum value among values expected by the elements of the input signal of the printer. Then, the gamut boundary of the printer is learned using a selected color with the back-propagation learning method of the neural network.

In other words, to learn an apparatus which simply and accurately judges whether a source color is in or out of gamut of a device, the gamut distance calculator is comprised of parameters, which is used to calculate the gamut distance, obtained by using the gamut boundary learning method. While the method for obtaining the gamut boundary is generally complicated, as described in Embodiment 1, by the use of the configuration where the direction cosine that can be obtained easily with the neural network is input, it is possible to calculate continuous smooth gamut distances from a relatively small number of color measurements.

Gamut distance calculator 3 configured as described above calculates the gamut distance Dg in the printer from input $S_L$, $S_a$ and $S_b$ to output to comparator 4.

Comparator 4 compares the length Ds of the source color vector input from source color distance calculator 1 to the gamut distance Dg input from gamut distance calculator 3, and when Ds is larger than Dg, judges that the source color is out of the gamut of the printer, and outputs Dg, while when Ds is smaller than Dg, judging that the source color is in the gamut of the printer, and outputting Ds.

As described above, gamut judging apparatus 6 in Embodiment 1 can judge whether the source color is in or out of the gamut of the printer simply and accurately using the length of the source color vector, and the gamut distance calculated from the direction cosine of the source color vector that can be easily calculated.

Next, multiplier 5 multiplies the direction cosine of the source color vector output from direction cosine calculator 2 by the value output from comparator 4, and outputs the resultant as the target color in the printer. Then, colors output with Lab values are transformed into RGB values as input signals to the printer, thus performing the print operation.

As described above, the color transform apparatus in Embodiment 1 outputs the source color as the target color when the source color is in the gamut of the printer, while outputting a color existing on the gamut boundary of the printer in the direction of the source color of the printer as the target color when the source color is out of the gamut.

Figure 2:
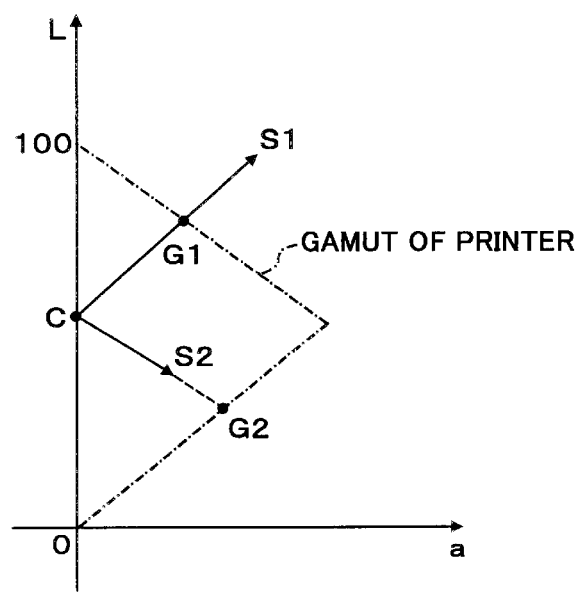
FIG. 2 is an explanatory diagram for color transform executed in the color transform apparatus according to one embodiment of the present invention.

The function of the above-mentioned color transform apparatus is explained with reference to FIG. 2. FIG. 2 is an explanatory diagram for the color transform executed in the color transform apparatus of Embodiment 1.

FIG. 2 illustrates a cross section obtained by cutting the Lab space with a plane containing an L axis and a axis. The dot-dash line illustrates the gamut of the printer, c illustrates the center color, $S_1$ and $S_2$ illustrate source colors, and $G_1$ and $G_2$ illustrate intersections at which the gamut boundary of the printer intersects respective source color vectors. The each length of $CS_1$ and $CS_2$ corresponds to Ds, and the each length of $CG_1$ and $CG_2$ corresponds to Dg. In addition, FIG. 2 illustrates only the gamut with positive a values.

According to the color transform apparatus of Embodiment 1, when the source color is out of the gamut of the printer like $S_1$, since the target color is obtained by multiplying the direction cosine of the vector $CS_1$ by Dg, a color corresponding to $G_1$ becomes the target color. On the other hand, when the source color is in the gamut of the printer like $S_2$, $S_s$ becomes the target color.

In the color transform apparatus of Embodiment 1, in both cases where the source color is in the gamut of the printer, in this case the source color becomes the target color, and where the source color is out of the gamut of the printer, the hue angle expressed with the equation 2 does not vary if lightness L and chroma expressed with the following equation 6 vary:

$$\sqrt{a^2 + b^2} \quad \text{[Eq. 6]}$$

As described above, the color transform apparatus of Embodiment 1 has the gamut distance calculator that uses the gamut boundary that is the result obtained by learning with the gamut boundary learning method of the present invention, and thereby can obtain the gamut distance simply and accurately. Accordingly, the gamut judging apparatus, which can judge whether a source color is in or out of the gamut simply and accurately, is constructed.

Further, by performing the appropriate color transform corresponding to whether the source color is in or out of the gamut using the judgment result obtained by the gamut judging apparatus, it is possible to transform the source color in the monitor to the target color in the gamut of the printer simply and excellently. Therefore, it is possible to provide the simplified excellent color transform apparatus.

In addition, the color transform apparatus of Embodiment 1 uses CIE L*a*b* space as color space to be used, and therefore performs the gamut judgment and color transform in the color space generally used, thus providing the gamut judging apparatus that performs accurate judgment simply, and the simplified excellent color transform apparatus.

Further, the color transform apparatus of Embodiment 1 sets the center color at a midpoint between the black point and white point on the achromatic axis, and thereby prevents the occurrence of wide fluctuation in a distance to the gamut boundary from the center color.

In addition, it is known that the learning is obtained faster and with high accuracy in the neural network generally when wide fluctuations are not in input and output values. Accordingly, adopting such a center color provides the gamut judging apparatus that performs accurate judgment further simply, and simplified excellent color transform apparatus.

Further, in the color transform apparatus of Embodiment 1, since an intersection at which the source color vector and the gamut boundary of the printer intersect is adopted as the target color for the source color that is out of the gamut of the printer, it is possible to transform the color out of the gamut of the printer to the color in the gamut of the printer with the gamut of the printer utilized as much as possible. Accordingly, the simplified excellent color transform apparatus is provided.

Moreover, although CIE L*a*b* is used as color space to be used in Embodiment 1, it may be possible to use CIE L*u*v* and CIE XYZ color systems. When the CIE L*u*v* and CIE XYZ color systems are used, it is also possible to perform the gamut judgment and color transform in the color space generally used.

In addition, although a monitor and printer are respectively assumed as a source device and target device in Embodiment 1, the present invention is not limited to the above case.

Further, although RGB values are assumed as input signals in the printer, it may be possible to use other input signals such as CMYK values.

Furthermore, Embodiment 1 explains the case where the program (software) is stored in a computer readable recording medium such as a CD-ROM, downloaded in a RAM of a personal computer, and executed by a CPU of the personal computer, and thereby the CPU operates as source color distance calculator 1, direction cosine calculator 2, gamut distance calculator 3, comparator 4 and multiplier 5. However, the present invention is not limited to the above case, and it may be possible to achieve the above-mentioned functions using other form such as LSI to use the above-mentioned processing sections as hardware.

In addition, although the multi-layered perceptron and back-propagation learning method are used as the neural network in Embodiment 1, the present invention is not limited to the above case. For example, it may be possible to use Learning Vector Quantization method and Radial Basis Function Network method.

Further, although Embodiment 1 is explained using an orthogonal coordinate system, it may be possible to use a polar coordinate system.

(Embodiment 2)

The following explains a color transform apparatus of Embodiment 2 in which gamut distance calculator 3 is comprised of a lookup table in the configuration of the color transform apparatus of Embodiment 1. In addition, since the operations in Embodiment 2 are the same as those in Embodiment 1 except the operation of gamut distance calculator 3, the explanations thereof are omitted.

Figure 3:
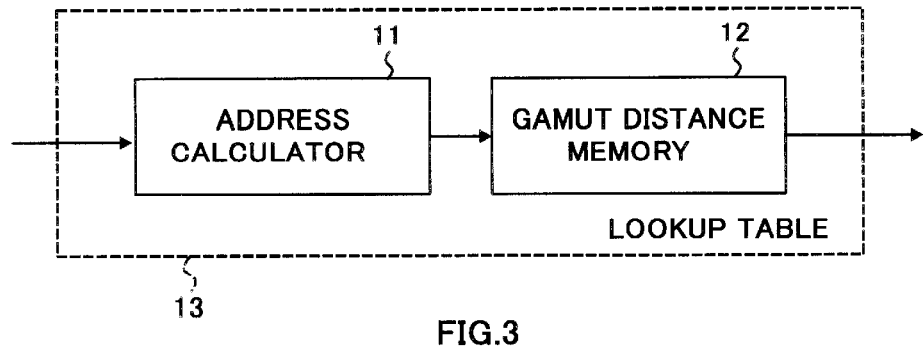
FIG. 3 is a block diagram of a gamut distance calculator according to Embodiment 2 of the present invention.

FIG. 3 is a block diagram illustrating a case that gamut distance calculator 3 in FIG. 1 is comprised of the lookup table.

In FIG. 3, address calculator 11 calculates a reference address of the lookup table from the direction cosine input from direction cosine calculator 2 in FIG. 1 to output to gamut distance memory 12.

Gamut distance memory 12 outputs a gamut distance stored at an address corresponding to the reference address input from address calculator 11 to comparator 4.

Thus, lookup table 13 is comprised of address calculator 11 and gamut distance memory 12.

The operation of lookup table 13 in Embodiment 2 of the present invention is explained below.

First, data is stored in lookup table 13. For that, the relationship between the direction cosine and the gamut distance of the printer is learned by the neural network and gamut boundary learning method thereof described in Embodiment 1.

Next, total fourteen direction cosines of six direction cosines (group 1) such that one of elements is 1 or −1 and the other elements are 0, and eight direction cosines (group 2) such that all absolute elements are as follows:

$$\frac{1}{\sqrt{3}} \quad [\text{Eq. 7}]$$

are input to the neural network, and gamut distances respectively corresponding to the direction cosines are calculated. Then, the input fourteen direction cosines are assigned respective addresses, and corresponding gamut distances are stored in gamut distance memory 12.

At the time of actual operation, first, address calculator 11 calculates which quadrant contains the input direction cosine using code of the input direction cosine. Next, the section 11 calculates the inner product of the input direction cosine with each of one vector of group 2 lying on the quadrant and three vectors of group 1 on the boundary of the quadrant, and then outputs an address corresponding to the direction cosine with the maximum inner product. Gamut distance memory 12 outputs a gamut distance corresponding to the input address.

For example, when the input direction cosine is (0.5, 0.5, 0.7071), the inner products of the direction cosine with each of four vectors of (1,0,0), (0,1,0), (0,0,1) and three elements being all [Eq.7] are calculated. Since the calculations are respectively 0.5, 0.5, 0.7071 and 0.9856, the vector with three elements being all [Eq.7] becomes the corresponding direction cosine.

Thereafter, the color transform apparatus of Embodiment 2 calculates the target color corresponding to the input source color in the same way as the color transform apparatus of Embodiment 1.

As described above, since gamut distance calculator 3 of the gamut judging apparatus according to Embodiment 2 is comprised of a lookup table that is simple, complicated calculations become no need. Accordingly, the gamut judging apparatus of Embodiment 2 enables the gamut judgment to be performed simply and accurately.

In addition, although the gamut distances corresponding to fourteen direction cosines of group 1 and group 2 are stored in the lookup table in Embodiment 2, the present invention is not limited to the above case, and it may be possible to use gamut distances corresponding to the other direction cosines.

Further, although the gamut distances corresponding to the direction cosines are calculated with the neural network, and stored in the lookup table in Embodiment 2, the present invention is not limited to the above case, and it may be possible to use a pair of the direction cosine calculated in other processing section and corresponding gamut distance, for example, to store the direction cosine used in the gamut boundary learning in Embodiment 1 and the corresponding gamut distance in the lookup table.

Furthermore, in Embodiment 2, in the address retrieval for the corresponding gamut distance, although direction cosines as objects are limited by the code, and then the inner products thereof are calculated to be compared to each other, the present invention is not limited to the above case. For example, it may be possible to store all the direction cosines with the possibility, and simply retrieve matching one, to calculate all the inner products without limiting by the code, and detect the maximum one, or to use Euclid distance.

In addition, in Embodiment 2, the corresponding program (software) is stored in a computer readable recording medium such as a CD-ROM, downloaded in a RAM of a personal computer, and executed by a CPU of the personal computer, and thereby the CPU operates as source color distance calculator 1, direction cosine calculator 2, comparator 4, address calculator 11 and multiplier 5. Further, the RAM of the personal computer is used as gamut distance memory 12.

(Embodiment 3)

The following explains a color transform apparatus according to Embodiment 3 in which gamut distance calculator 3 is comprised of a lookup table and interpolator in the configuration of the color transform apparatus of Embodiment 1. In addition, since the operations in Embodiment 3 are the same as those in Embodiment 1 except the operation of gamut distance calculator 3, the explanations thereof are omitted.

Figure 4:
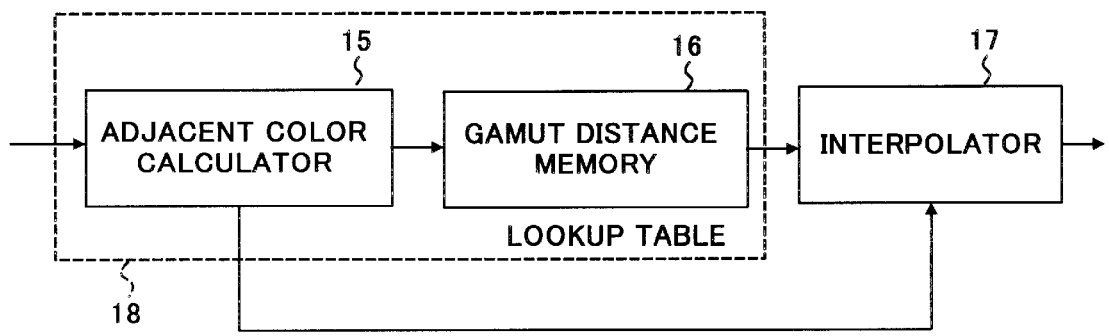
FIG. 4 is a block diagram of a gamut distance calculator according to Embodiment 3 of the present invention.

FIG. 4 is a block diagram illustrating a case that gamut distance calculator 3 in FIG. 1 is comprised of the lookup table and interpolator. In FIG. 4, adjacent color calculator 15 receives the direction cosine output from direction cosine calculator 2 in FIG. 1, and calculates three colors adjacent to the direction cosine. Then, adjacent color calculator 15 outputs respective distances between the direction cosine and three colors as weights to interpolator 17, while outputting respective addresses at which the three colors are stored to gamut distance memory 16.

Using the addresses of the three colors input from adjacent color calculator 15, gamut distance calculator 16 outputs three gamut distances respectively corresponding to the addresses to interpolator 17.

Interpolation section 17 calculates the final gamut distance using the weights input from adjacent color calculator 15 and the gamut distances input from gamut distance memory 16. Thus, lookup table 18 is comprised of adjacent color calculator 15 and gamut distance memory 16.

The operations of lookup table 18 and interpolator 17 in Embodiment 3 in the present invention are explained below.

First, it is necessary to store data in lookup table 18. For that, the relationship between the direction cosine and the gamut distance of the printer is learned by the neural network and gamut boundary learning method thereof described in Embodiment 1.

Next, total fourteen direction cosines of six direction cosines (group 1) with Lab values such that one of elements is 1 or −1 and the other elements are 0, and eight direction cosines (group 2) with Lab values such that all absolute elements are the value of [Eq.7] are input to the neural network. Then, respective gamut distances corresponding to these direction cosines are calculated. Next, addresses are respectively assigned for fourteen input direction cosines, and corresponding gamut distances are stored in gamut distance memory 16.

At the time of actual operation, adjacent color calculator 15 calculates which quadrant contains the input direction cosine using code of the input direction cosine, next calculates the inner product of the input direction cosine with each of one vector of group 2 lying on the quadrant and three vectors of group 1 on the boundary of the quadrant, and then outputs respective addresses corresponding to the three direction cosine in descending order of the inner product, while outputting the inner products respectively corresponding to the addresses to be output to interpolator 17.

Gamut distance memory 16 outputs three gamut distances respectively corresponding to the three input addresses. Then, interpolator 17 outputs the final gamut distance while calculating with the weights corresponding to the inner products.

For example, when the input direction cosine is (0.4, 0.6, 0.6928), the inner products of the direction cosine with each of four vectors of (1,0,0), (0,1,0), (0,0,1) and three elements being all [Eq.7] are calculated. Since the calculations are respectively 0.4, 0.6, 0.6928 and 0.9773, the vector with three elements being all [Eq.7], vector of (0,0,1) and vector of (0,1,0) become the corresponding vectors in this order. The inner products corresponding to the obtained direction cosines are 0.9773, 0.6928 and 0.6, respectively.

Assuming that gamut distances corresponding to the direction cosines output from gamut distance memory 16 are $D_1$, $D_2$ and $D_3$, respectively, the final gamut distance is calculated with the following equation 8:

$$\frac{0.9773 D_1 + 0.6928 D_2 + 0.6 D_3}{0.9773 + 0.6928 + 0.6} \qquad [\text{Eq. 8}]$$

As described above, the color transform apparatus according to Embodiment 3 can perform the gamut judgment easily since gamut distance calculator 3 is comprised of the convenient lookup table and interpolator. Further, having the interpolator enables the color transform apparatus to have the function of performing an accurate gamut judgment also on colors not being stored in the lookup table.

In addition, although the gamut distances are weighted with the inner products in the interpolator in Embodiment 3, it may be possible to use other methods such as a method using the Euclid distance to each direction cosine.

Further, although three direction cosines are selected, the present invention is not limited to the above case. For example, it may be possible to select all the stored direction cosines such that the distance therefrom to the input direction cosine is within a threshold, and interpolate the gamut distances corresponding to the selected direction cosines.

In addition, in Embodiment 3, the corresponding program (software) is stored in a computer readable recording medium such as a CD-ROM, downloaded in a RAM of a personal computer, and executed by a CPU of the personal computer, and thereby the CPU operates as source color distance calculator 1, direction cosine calculator 2, comparator 4, adjacent color calculator 15, interpolator 17, and multiplier 5. Further, a RAM of the personal computer is used as gamut distance memory 16.

(Embodiment 4)

The gamut boundary learning method according to Embodiment 4 of the present invention is explained below.

The learning of the gamut boundary of a monitor is assumed in Embodiment 4. First generated are 216 groups of RGB input signals of which a value is either of 0, 50, 100, 150, 200 or 255. Pictures corresponding to respective input signals are displayed on the monitor, and the pictures are measured with a colorimeter to obtain Lab values.

Next, lightness axis L is divided to four intervals of [0,25.0], [25.0,50.0], [50.0,75.0] and [75.0,100.0]. The hue is further divided to eight intervals by judging code of a and b, and whether which absolute value of a or b is larger, thus dividing the Lab space to 32 small areas.

Next, the Lab values corresponding to the 216 input signal groups are sorted to either of the 32 small areas, a group with the maximum hue, calculated with [Eq.6], is selected for each small area, and selected 32 colors are considered to exist on the gamut boundary. Then, in the same as in Embodiment 1, the direction cosines of the selected colors and lengths between the selected colors and the center colors thereof are learned respectively with the combination of the multi-layered perceptron and back-propagation learning method.

As described above, the gamut boundary learning method according to Embodiment 4 divides the color space to areas with the lightness and hue, selects colors with the maximum hue in the gamut of a device for each divided area to learn, and thereby provides the simplified accurate gamut judging apparatus and the learning of the gamut boundary needed for the simplified excellent color transform apparatus.

In addition, although 216 groups of Lab values are generated while actually performing the color measurement in Embodiment 4, the present invention is not limited to the above case. For example, it may be possible to obtain Lab values with an equation assuming that the monitor is an sRGB monitor that is one of standard monitors. Further, it may be possible to obtain coefficients for interpolation, neural network and masking equation from the color-measured 216 groups to add new groups of Lab values, and select colors considered to exist on the gamut boundary from the increased Lab groups.

Furthermore, it is assumed that in the gamut boundary learning method according Embodiment 4, the computer readable corresponding program (software) is downloaded in a RAM of a personal computer from a recording medium such as a CD-ROM, and is executed by a CPU of the personal computer, and thereby the CPU operates for the gamut boundary learning method according to Embodiment 4.

(Embodiment 5)

The gamut boundary learning method according to Embodiment 5 of the present invention is explained below.

The learning of the gamut boundary of a monitor is assumed in Embodiment 5. First generated are 216 groups of RGB input signals of which a value is either of 0, 50, 100, 150, 200 or 255. Pictures corresponding to respective input signals are displayed on the monitor, and the pictures are measured with a colorimeter to obtain Lab values.

Next, total fourteen direction cosines of six direction cosines (group 1) with Lab values such that one of elements is 1 or −1 and the other elements are 0, and eight direction cosines (group 2) with Lab values such that all absolute elements are the value of [Eq.7] are selected.

Next, assuming segments obtained by respectively extending selected fourteen direction cosines from the center value with Lab value of (50,0,0), a sample point is prepared on each segment every time the distance from the center color is increased by 10 until 15 samples are obtained. Therefore, the distance between the farthest sample point and the center color is 150.

Then, for each segment in order of increasing the distance from the center point, a color closest to the color of the sample point is searched from among 216 colors obtained by the color measurement, and the distance between the sample point and searched color is obtained. When the distance exceeds a predetermined threshold, the sample point with the distance is considered to exist on the segment and gamut boundary of the monitor.

The above-mentioned operation is performed for each segment, thus selecting fourteen sample points considered to exist on the boundary of the monitor. Then, in the same way as in Embodiment 1, the corresponding direction cosine and the distance from the corresponding center color are learned with the multi-layered perceptron and back-propagation learning method.

As described above, the gamut boundary learning method according to Embodiment 5 sets a plurality of segments from the center color in the gamut of a device radially. Then, a plurality of first sample colors are arranged on the segment, the distance between the first sample color and each of a plurality of second sample colors in the gamut of the device is measured to select the minimum distance to be compared to a threshold, and the first sample color with the shortest distance from the center color is selected from among first sample colors with the minimum distance exceeding the threshold for each segment.

The first sample color selected for each segment is selected as a color considered to exist on the gamut boundary of the device to learn, thereby providing a simplified accurate gamut judging apparatus and the learning of the gamut boundary needed for simplified excellent color transform apparatus.

Further, it is assumed that in the gamut boundary learning method according Embodiment 5, the computer readable corresponding (software) program is downloaded in a RAM of a personal computer from a recording medium such as a CD-ROM, and executed by a CPU of the personal computer, and thereby the CPU operates for the gamut boundary learning method according to Embodiment 5.

(Embodiment 6)

A gamut judging apparatus according to Embodiment 6 is explained below. In addition, the gamut judgment of a printer with Lab values each indicated by 8 bits is assumed in Embodiment 6.

Figure 5:
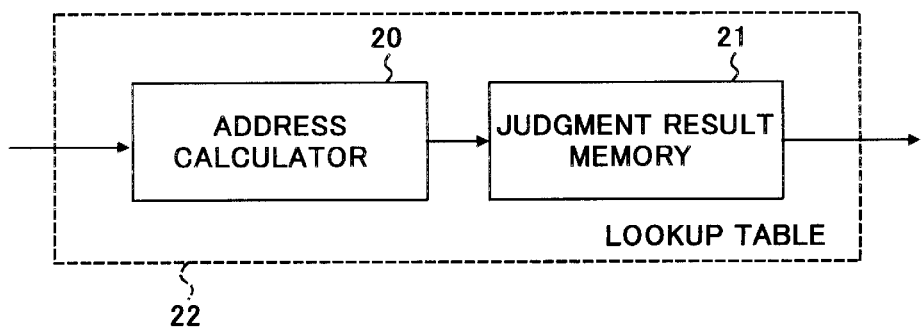
FIG. 5 is a block diagram of a gamut judging apparatus according to Embodiment 6 of the present invention.

FIG. 5 is a block diagram illustrating the case that the gamut judging apparatus of the present invention is comprised of a lookup table.

In FIG. 5, address calculator 20 receives an input of a color to be subjected to the gamut judgment, and outputs an address at which a judgment result corresponding to the color is stored.

Judgment result memory 21 outputs the judgment result corresponding to the address input from address calculator 20. Thus, lookup table 22 is comprised of address calculator 20 and judgment result memory 21.

The operation of the gamut judging apparatus according to Embodiment 6 is explained below.

First, with respect to colors corresponding to 4096 groups of Lab values each with lower 4 bits being 0 in every 8 bits, the gamut judgment is performed in advance in the gamut judging apparatus with the same configuration as that of the gamut judging apparatus explained in Embodiment 1. Next, a value with 12 bits obtained by arranging upper 4 bits containing a code bit in every 8 bits of Lab values in the order of L, a and b is stored as an address value in judgment result memory 21.

At the time of actual operation, address calculator 20 calculates upper 4 bits of the input Lab values, and judgment result memory 21 calculates the gamut judgment result corresponding to the address to output.

As described above, the gamut judging apparatus according to Embodiment 6 stores the gamut judgment results obtained by the gamut judging apparatus of the present invention in the lookup table, and thereby can perform the gamut judgment fast using the lookup table without using a complicated gamut judging apparatus. Accordingly, it is possible to perform the gamut judgment conveniently and accurately.

Further, in Embodiment 6, the corresponding program (software) is stored in a computer readable recording medium such as a CD-ROM, downloaded in a RAM of a personal computer, and executed by a CPU of the personal computer, and thereby the CPU operates as address calculator 20 and multiplier 5. Furthermore, the RAM of the personal computer is used as judgment result memory 21.

(Embodiment 7)

A gamut judging apparatus according to Embodiment 7 is explained below. In addition, the gamut judgment of a printer with Lab values each indicated by 8 bits is assumed in Embodiment 7.

Figure 6:
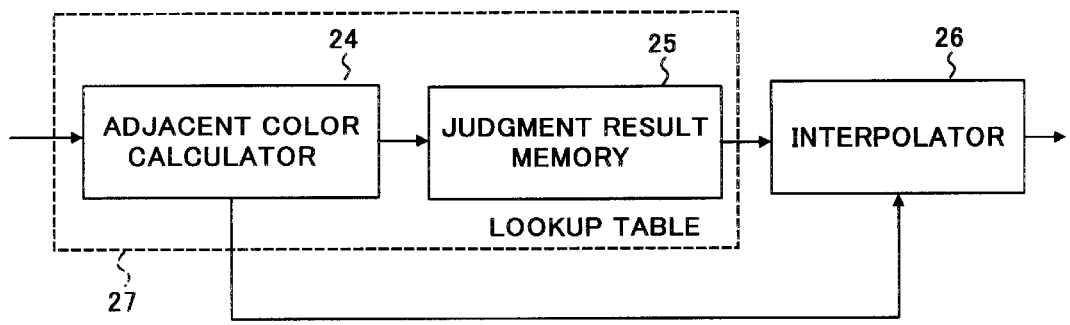
FIG. 6 is a block diagram of a gamut judging apparatus according to Embodiment 7 of the present invention.

FIG. 6 is a block diagram illustrating the gamut judging apparatus according to Embodiment 7.

In FIG. 6, adjacent color calculator 24 calculates eight colors adjacent to a source color from an input source color with Lab values, and outputs addresses corresponding to these eight colors to judgment result memory 25.

Judgment result memory 25 outputs eight judgments results corresponding to the addresses of eight colors input from adjacent color calculator 24 to interpolator 26.

Interpolation section 26 calculates a final judgment result to output, using the judgment results input from judgment result memory 25.

Thus, lookup table 27 is comprised of adjacent color calculator 24 and judgment result memory 25.

The operation of the gamut judging apparatus according to Embodiment 7 is explained below.

First, with respect to colors corresponding to 4096 groups of Lab values each with lower 4 bits being 0 in every 8 bits, the gamut judgment is performed in advance in the same gamut judging apparatus with the same configuration as that of the gamut judging apparatus explained in Embodiment 1. Next, a value of 12 bits obtained by arranging upper 4 bits containing a code bit in every 8 bits of Lab values in order of L, a and b is stored as an address value in judgment result memory 21. These 4096 colors form lattice points in Lab space.

At the time of actual operation, fist adjacent color calculator 24 outputs addresses of eight colors obtained by combining upper 4 bits of each of the input Lab values and a value obtained by adding 1 to the upper 4 bits of each of the Lab values. Each of thus calculated eight colors corresponds to each vertex of the lattice in the Lab space containing the input source color.

Next, judgment result memory 25 calculates judgment results of eight colors to output to interpolator 26. Interpolation section 26 counts the number of judgment results indicative of in-gamut-color among eight judgment results input from judgment result memory 25, and when the number exceeds 4, judges that the color is in the gamut, while when the number is equal to or smaller than 4, judging that the color is out of the gamut, to output the judgment result.

As described above, the gamut judging apparatus according to Embodiment 7 has the lookup table with judgment results obtained by the gamut judging apparatus of the present invention, and when the source color is different from a representative color of the lookup table, judges whether the source color is in or out of the gamut using judgment results corresponding to a plurality of representative colors adjacent to the source color. Thereby, it is possible to perform the gamut judgment with high speed. Accordingly, the gamut judging apparatus of Embodiment 7 has the function for performing the gamut judgment simply and accurately.

In addition, although in Embodiment 7 the judgment is obtained according to the majority of the judgment results of the lattice points including the source color, for example, it may be possible to perform the judgment using weighted lower 4 bits of the source color.

Further, in Embodiment 7, the corresponding program (software) is stored in a computer readable recording medium such as a CD-ROM, downloaded in a RAM of a personal computer, and executed by a CPU of the personal computer, and thereby the CPU operates as adjacent color calculator 24, interpolator 26 and multiplier 5. Furthermore, the RAM of the personal computer is used as judgment result memory 25.

(Embodiment 8)

A color transform apparatus according to Embodiment 8 is explained below.

Figure 7:
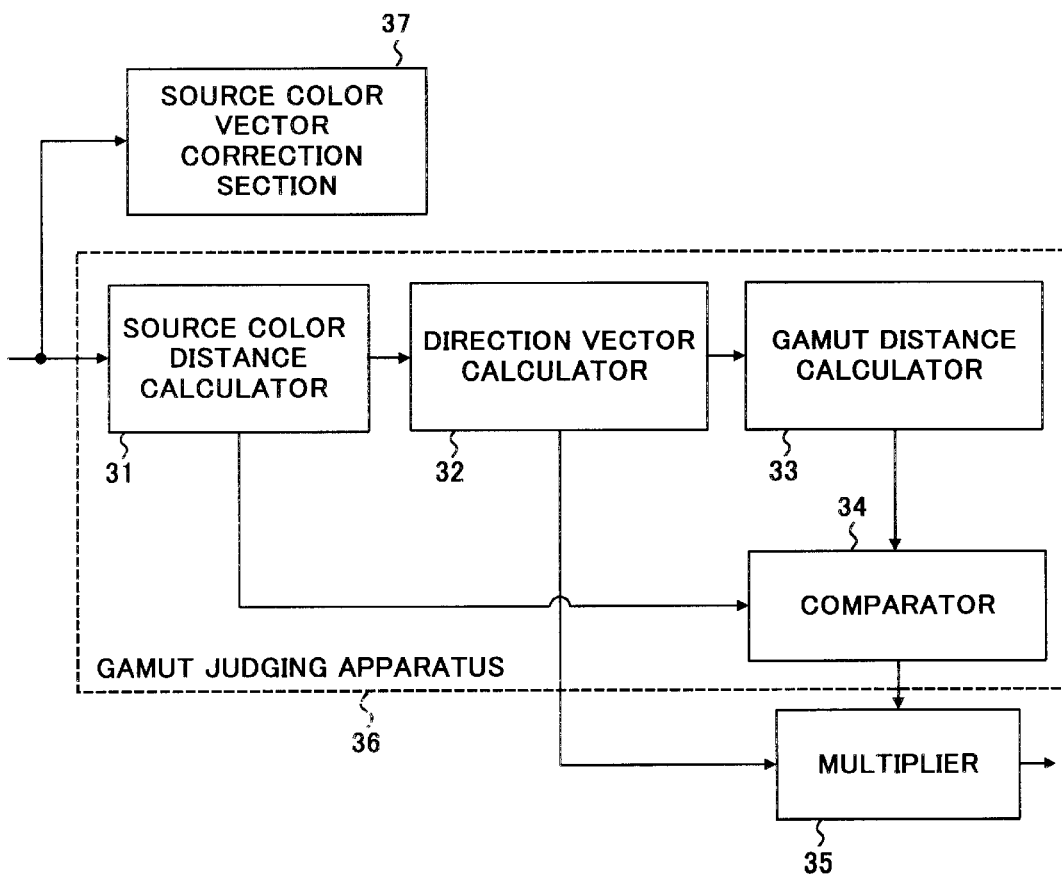
FIG. 7 is a block diagram illustrating a configuration of a color transform apparatus according to one embodiment of the present invention.

FIG. 7 is a block diagram illustrating a configuration of the color transform apparatus according to this embodiment.

The color transform from a monitor to a printer is assumed in Embodiment 8 as in Embodiment 1, and further it is assumed that the gamut judging apparatus and color transform apparatus are achieved by software on a personal computer.

In FIG. 7, source color distance calculator 31 calculates a length of a source color vector connecting a center color set in the gamut to the source color using the input source color, and outputs the source color vector and the length of the source color vector.

Directional vector calculator 32 calculates a direction cosine of the source color vector using the source color vector and the length of the source color vector input from source color distance calculator 31 to output.

Gamut distance calculator 33 calculates a gamut distance between the gamut boundary of the printer and the center color using the direction cosine of the source color vector input from direction cosine calculator 32.

Comparator 34 compares the length of the source color vector output from source color distance calculator 31 to the gamut distance output from gamut distance calculator 33. Then, when the length of the source color vector is larger than the gamut distance, comparator 4 judges that the source color is out of the gamut of the printer, and outputs the gamut distance. When length of the source color vector is smaller than the gamut distance, comparator 4 judges that the source color is in the gamut of the printer, and outputs the length of the source color vector.

Multiplier 35 multiplies the direction cosine of the source color vector output from direction cosine calculator 32 by an output from comparator 34, and outputs the resultant as a target color corresponding to the source color.

Source color vector correction section 37 outputs a corrected source color vector using the source color vector and the length of the source color vector output from source color distance calculator 31, and the gamut distance output from gamut distance calculator 33.

Thus, gamut judging apparatus 36 is comprised of source color distance calculator 31, direction cosine calculator 32, gamut distance calculator 33 and comparator 34.

The operation of the color transform apparatus according to Embodiment 8 is explained below.

In addition, gamut distance calculator 33 is comprised of the neural network which learns with the gamut boundary learning method of the present invention as in Embodiment 1, and the specific explanation thereof is omitted. Further, source color distance calculator 31, direction cosine calculator 32, comparator 34, and multiplier 35 each has the same configuration as in Embodiment 1, and the specific explanations thereof are omitted.

First, when a first source color is input from an outside, in the same way as in Embodiment 1, source color distance calculator 31 calculates a distance Ds of the first source color vector, direction cosine calculator 32 calculates a direction cosine of the first source color vector, and gamut distance calculator 33 calculates a gamut distance Dg of the printer.

Next, to source color vector correction section 37, the first source color vector and the length Ds thereof are input from source color distance calculator 31, and the gamut distance Dg of the printer corresponding to the first source color vector is input from gamut distance calculator 33. Then, it is assumed that elements of the first source color vector are $S_{1L}$, $S_{1a}$ and $S_{1b}$. In the case where $S_{1L}$ is negative, $S_{1a}$ is positive, $-S_{1a} > S_{1b}$ and Ds>Dg, a second source color vector $(S_{2L}, S_{2a}, S_{2b})$ is calculated with the following equation 9:

$$S_{2L} = \frac{Ds}{Dg} S_{1L}, \quad S_{2a} = S_{1a}, \quad S_{2b} = 1.1 S_{1b} \qquad [\text{Eq. 9}]$$

In the cases other than the above case, $S_{1L}, S_{1a}, S_{1b}$ become $S_{2L}, S_{2a}, S_{2b}$ without any corrections.

The conditions that $S_{1L}$ is negative, $S_{1a}$ is positive, and $-S_{1a} > S_{1b}$ correspond to the case that the source color is dark blue. In the case where the source color is dark blue in Lab space, the effect that apparent hue varies is generally remarkable due to the compression of chroma called the Abney effect that the apparent hue varies due to variation of lightness called the Bezold-Brucke effect. Therefore, the color transform simply performed according to the source color vector causes undesirable phenomenon that the apparent hue varies.

Accordingly, in the case where the source color is dark blue judged as the out of the gamut of the printer, it is possible to reduce the above-mentioned effect by lowering the lightness and making the hue close to the b axis.

Further, as expressed in the equation 9, the degree of the variation of lightness is adjusted by Ds/Dg indicative of a degree by which the source color is away from the gamut boundary of the printer, whereby the second source color vector is generated smoothly without causing discontinuity in the lightness.

Next, the second source color vector is input to source color distance calculator 31, thereafter the same processing as in Embodiment 1 is performed, and thus the final target color is obtained.

As described above, in Embodiment 8, the second source color vector is calculated from the gamut distance in a first device corresponding to the first source color vector, the length of the first source color vector, and elements of the first source color vector. Then, when the source color is out of the gamut of the first device, the intersection at which the second source color vector intersects the gamut boundary of the first device is set as the target color. Further with respect to out-of-gamut source colors, when the color transform simply performed according to the source color vector causes, for example, the hue to vary, the intersection at which the second source color vector intersects the gamut boundary of the target device is obtained, and the obtained point is set as the target color.

Thereby, it is possible to transform the gamut of the source device so that the gamut of the target device is utilized as much as possible, and to transform a color that cannot be processed in the target device to a color that can be processed therein. Accordingly, it is possible to perform simplified and excellent color transform.

In addition, although the second source color vector is calculated with the equation 9 in this embodiment, the present invention is not limited to the above case, and it may be possible to use other equations or coefficients.

Further, although only the source color corresponding to dark blue out of the gamut of the first device adopts the second source color vector that is different from the first source color, the present invention is not limited to the above case, and it may be possible to calculate second source color vectors for all the first source color vectors. For example, in addition to dark blue, second source color vectors may be calculated for yellow and flesh color such that the variation of the hue tends to be noticeable.

Further, in Embodiment 8, the corresponding program (software) is stored in a computer readable recording medium such as a CD-ROM, downloaded in a RAM of a personal computer, and executed by a CPU of the personal computer, and thereby the CPU operates as source color distance calculator 31, direction cosine calculator 32, gamut distance calculator 33, comparator 34, multiplier 35, and source color vector correction section 37.

(Embodiment 9)

A color transform apparatus according to Embodiment 9 is explained below.

Figure 8:
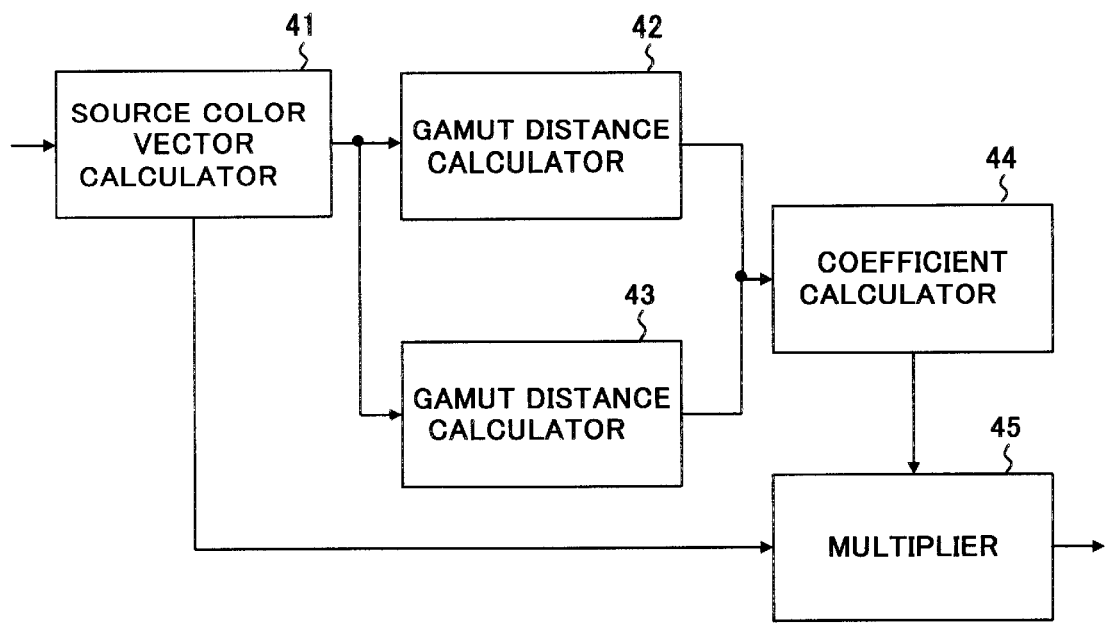
FIG. 8 is a block diagram illustrating a configuration of a color transform apparatus according to one embodiment of the present invention.

FIG. 8 is a block diagram illustrating a configuration of the color transform apparatus with a gamut distance calculator using the gamut boundary learning method of the present invention.

In Embodiment 9, as in Embodiment 1, the color transform from a monitor to a printer in Lab space is assumed, and it is further assumed to achieve the color transform apparatus by software on a personal computer.

In FIG. 8, source color vector calculator 41 calculates a source color vector connecting an input source color and a center color with Lab value of (50,0,0) existing in the gamut common to the monitor and printer to output.

Gamut distance calculator 42 receives as an input the source color vector calculated by source color vector calculator 41, and calculates a first gamut distance between the center color and an intersection at which the source color vector or the extended source color vector intersects the gamut boundary of the printer.

Gamut distance calculator 43 calculates a second gamut distance between the center color and an intersection at which the source color vector or the extended source color vector intersects the gamut boundary of the monitor.

Coefficient calculator 44 calculates a coefficient from the first gamut distance output from gamut distance calculator 42 and the second gamut distance output from gamut distance calculator 43 to output.

Multiplier 45 multiplies the source color vector output from source color vector calculator 41 by the coefficient output from coefficient calculator 44, and outputs the resultant as an output of the color transform apparatus.

The operation of the color transform apparatus in Embodiment 9 is explained below.

When the input source color with the Lab value is assumed to be (L, a, b), source color vector calculator 41 calculates the source color vector ($S_L$, $S_a$, $S_b$) with the following equation 10:

$$S_L=L-50, S_a=a, S_b=b \quad [Eq.10]$$

Next, using the source color vector output from source color vector calculator 41, gamut distance calculator 42 calculates the first gamut distance Dp as a distance between the center color and the intersection at which the source color vector or the extended source color vector intersects the gamut boundary of the printer.

Gamut distance calculator 42 in Embodiment 9 adopts the same configuration and operation obtained by combining direction cosine calculator 2 and gamut distance calculator 3 in Embodiment 1 of the present invention, and the specific explanation thereof is omitted.

At the same time, using the source color vector output from source color vector calculator 41, gamut distance calculator 43 calculates the second gamut distance Dm as a distance between the center color and the intersection at which the source color vector or the extended source color vector intersects the gamut boundary of the monitor.

Gamut distance calculator 43 in Embodiment 9 is comprised of the neural network, and performs the learning with the gamut boundary learning method in Embodiment 4, and therefore the specific explanation thereof is omitted.

Coefficient calculator 44 calculates Dp/Dm to output as a coefficient. Multiplier 45 multiplies the source color vector output from source color vector calculator 41 by Dp/Dm output from coefficient calculator 45, and outputs the resultant as an output of the color transform apparatus.

The function of the color transform apparatus according to Embodiment 9 is explained below with reference to FIG. 9.

Figure 9:
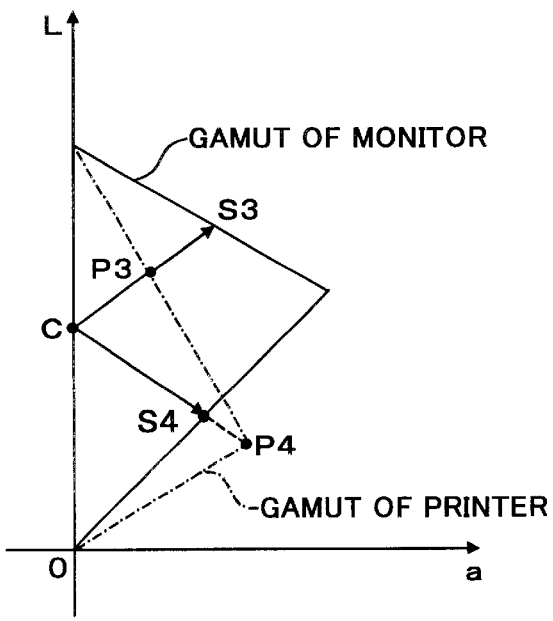
FIG. 9 is an explanatory diagram for color transform executed in the color transform apparatus according to one embodiment of the present invention.

FIG. 9 is an explanatory diagram for the color transform executed in the color transform apparatus according to Embodiment 9. FIG. 9 illustrates a cross section obtained by cutting the Lab space with a plane containing an L axis and a axis. The gamut of the printer and that of the monitor are illustrated with respective triangles. C is the center color. $S_3$ and $S_4$ are source colors existing on the gamut boundary of the monitor. $P_3$ and $P_4$ are intersections at which the respective source color vector or the extended source color intersects the gamut boundary of the printer. Each length of $CS_3$ and $CS_4$ corresponds to Dm, and each length of $CP_3$ and $CP_4$ corresponds to Dp.

Then, $S_3$ and $S_4$ are respectively transformed into $P_3$ and $P_4$ with the color transform according to Embodiment 9. Further, segments $CS_3$ and $CS_4$ are respectively transformed into segments $CP_3$ and $CP_4$ while being compressed or extended linearly. Accordingly, each color in the gamut of the monitor is transformed into a color in the gamut of the printer in such a way that the entire gamut of the printer is utilized.

In addition, unless quantization is executed, different colors in the monitor are transformed into different colors also in the printer with original gradation kept. Further, the hue expressed with the equation 6 does not vary if the chroma and lightness vary. Accordingly, the color transform apparatus has the function for performing the simplified excellent color transform.

Furthermore, in the color transform apparatus of Embodiment 9, gamut distance calculators 42 and 43 are comprised of the neural network with the direction cosine as an input and the gamut distance as an output, which uses results obtained by the gamut boundary learning method of the present invention. Therefore, it is possible to calculate continuous smooth gamut distances simply and accurately. Accordingly, it is possible for the color transform apparatus of Embodiment 9 to have the function for performing the simplified excellent color transform.

Moreover, in the color transform apparatus of Embodiment 9, since the center color is set at a midpoint on the achromatic axis, an achromatic color is always transformed into the achromatic color with the hue expressed with the equation 6 not varied. Accordingly, the color transform apparatus of Embodiment 9 has the function for performing the simplified excellent color transform.

Further, since wide fluctuations are not generated in the gamut distances between the center color and respective gamut boundary of the printer and monitor, the leaning of the neural network proceeds fast and accurately. Accordingly, it is possible to perform the simplified excellent color transform.

In addition, in the color transform apparatus of Embodiment 9, although gamut distance calculators 42 and 43 are comprised of the neural network with the direction cosine as an input and the gamut distance as an output, the same effects may be obtained by using a lookup table with the direction cosine as an input and the gamut distance as an output, or using such a lookup table and interpolator as in Embodiments 3 and 4.

Further, in Embodiment 9, the corresponding program (software) is stored in a computer readable recording medium such as a CD-ROM, downloaded in a RAM of a personal computer, and executed by a CPU of the personal computer, and thereby the CPU operates as source color vector calculator 41, gamut distance calculators 42 and 43, coefficient calculator 44 and multiplier 45. Furthermore, the RAM of the personal computer is used as judgment result memory 25.

(Embodiment 10)

A color transform apparatus according to Embodiment 10 is explained below. In addition, in the color transform apparatus according to Embodiment 10, the operation of coefficient calculator 44 is only different from that in the color transform apparatus according to Embodiment 9, and specific explanations of the operations except that of coefficient calculator 44 are omitted. The following description first explains the operation of coefficient calculator 44, and then explains the function of the color transform apparatus according to Embodiment 10, with reference to the drawing.

At the time the color transform apparatus according to Embodiment 10 operates, coefficient calculator 44 receives the gamut distance Dp output from gamut distance calculator 42 and the gamut distance Dm output from gamut distance calculator 43, and outputs 1 in the case of Dp>Dm, while outputting Dp/Dm in the other cases, to multiplier 45.

The function of the color transform apparatus according to Embodiment 10 is explained below with reference to FIG. 9.

In FIG. 9, $S_3$ is out of the gamut of the printer, and is transformed into $P_3$ in the color transform apparatus according to Embodiment 10 in the same as in the color transform apparatus of Embodiment 9, and the segment $CS_3$ is transformed into the segment $CP_3$ while being compressed linearly.

Accordingly, each color in the gamut of the monitor is transformed into a color in the gamut of the printer in such a way that the entire gamut of the printer is utilized.

On the other hand, $S_4$ is in the gamut of the printer, and is transformed into $S_4$, and the segment $CS_4$ is transformed into the segment $CS_4$ without being changed, in the color transform apparatus according to Embodiment 10. In other words, colors on the segment $CS_4$ match respective original colors, and thus the original colors are accurately reproduced.

Accordingly, the color transform apparatus according to claim 10 holds original colors to reproduce colors of the monitor accurately when the gamut of the printer includes the gamut of the monitor, while compressing the gamut linearly to transform colors of monitor into colors that can be represented in the printer when the gamut of the monitor is out of the gamut of the printer. Accordingly, different colors in the monitor are transformed into different colors also in the printer with original gradation kept.

Further, the hue expressed with the quotation 6 does not vary if the chroma and lightness vary. Accordingly, the color transform apparatus of Embodiment 10 has the function for performing simplified excellent color transform.

(Embodiment 11)

A color transform apparatus according to Embodiment 11 is explained below.

Figure 10:
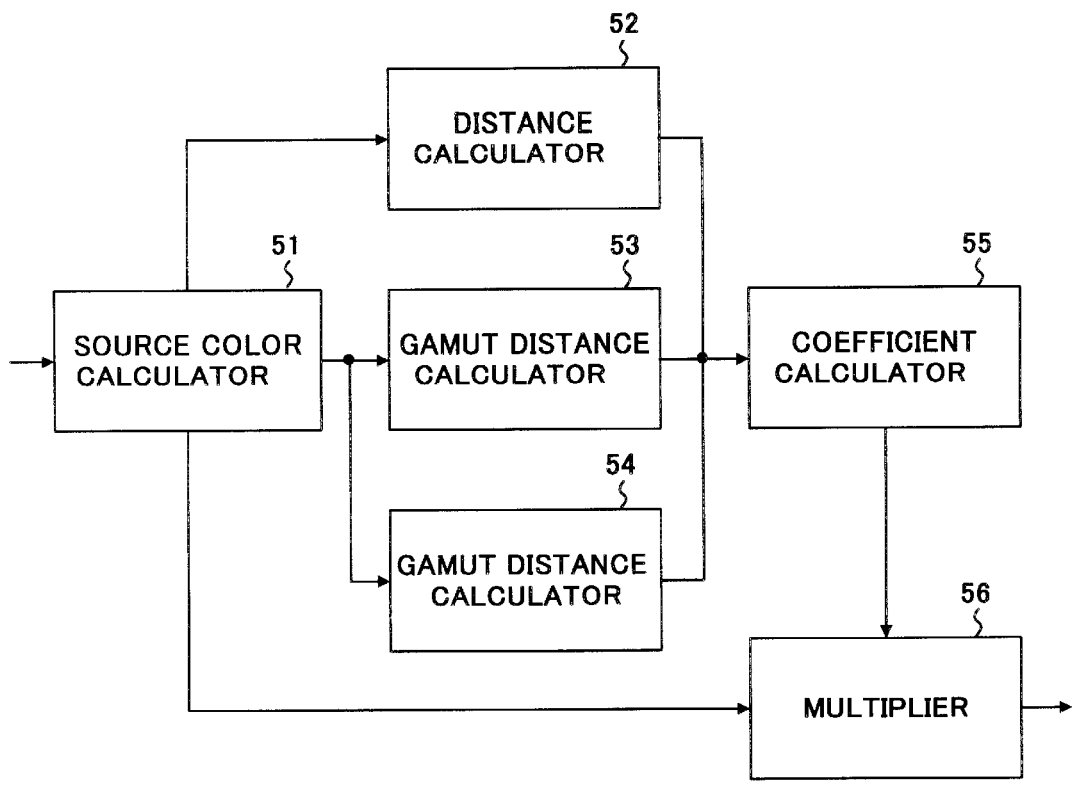
FIG. 10 is a block diagram illustrating a configuration of a color transform apparatus according to one embodiment of the present invention.

FIG. 10 is a block diagram illustrating a configuration of the color transform apparatus according to Embodiment 11.

In Embodiment 11, as in Embodiment 1, the color transform from a monitor to a printer in Lab space is assumed, and it is further assumed to achieve the color transform apparatus by software on a personal computer.

In FIG. 10, source color vector calculator 51 calculates a source color vector connecting an input source color and a center color with Lab value of (50,0,0) existing in the gamut common to the monitor and printer to output.

Distance calculator 52 receives as an input the source color vector calculated by source color vector calculator 51, and outputs the length of the source color vector.

Gamut distance calculator 53 receives as an input the source color vector calculated by source color vector calculator 51, and calculates a first gamut distance between the center color and an intersection at which the source color vector or the extended source color vector intersects the gamut boundary of the printer.

Gamut distance calculator 54 calculates a second gamut distance between the center color and an intersection at which the source color vector or the extended source color vector intersects the gamut boundary of the monitor.

Coefficient calculator 55 calculates a coefficient from the first gamut distance output from gamut distance calculator 53 and the second gamut distance output from gamut distance calculator 54 to output.

Multiplier 56 multiplies the source color vector output from source color vector calculator 51 by the coefficient output from coefficient calculator 55, and outputs the resultant as an output of the color transform apparatus.

The operation of the color transform apparatus in Embodiment 11 is explained below.

When the input source color with the Lab value is assumed to be (L, a, b), source color vector calculator 51 calculates the source color vector $(S_L, S_a, S_b)$ with the equation 10 previously described. Then, distance calculator 52 calculates the length Ds of the source color vector with the following equation 11:

$$\sqrt{S_L^2 + S_a^2 + S_b^2} \qquad \text{[Eq. 11]}$$

Next, using the source color vector output from source color vector calculator 51, gamut distance calculator 53 calculates the first gamut distance Dp as a distance between the center color and the intersection at which the source color vector or the extended source color vector intersects the gamut boundary of the printer.

Gamut distance calculator 53 in Embodiment 11 adopts the same configuration and operation obtained by combining direction cosine calculator 2 and gamut distance calculator 3 in Embodiment 1 of the present invention, and the specific explanation thereof is omitted.

At the same time, using the source color vector output from source color vector calculator 51, gamut distance calculator 54 calculates the second gamut distance Dm as a distance between the center color and the intersection at which the source color vector or the extended source color vector intersects the gamut boundary of the monitor.

Gamut distance calculator 54 in Embodiment 11 is comprised of the neural network, and performs the learning with the gamut boundary learning method in Embodiment 4, and therefore the specific explanation thereof is omitted.

Coefficient calculator 55 receives the length Ds of the source color vector output from distance calculator 52, the first gamut distance Dp output from gamut distance calculator, and the second gamut distance Dm output from gamut distance calculator 54.

Assuming that a predetermined threshold Dt is set to be smaller than Dp and Dm, coefficient calculator 55 outputs as a coefficient 1 in the case of Ds<Dt, Dp/Dm in the case of Ds=Dm, and the following in the other cases:

$$\frac{Dp - Dm}{Dm(Dm - Dt)}(Ds - Dt) + 1 \quad [\text{Eq. 12}]$$

Then, multiplier 56 multiplies the source color vector output from source color vector calculator 51 by the coefficient output from coefficient calculator 55, and outputs the resultant as an output of the color transform apparatus.

The function of the color transform apparatus according to Embodiment 11 is explained below with reference to FIG. 11.

Figure 11:
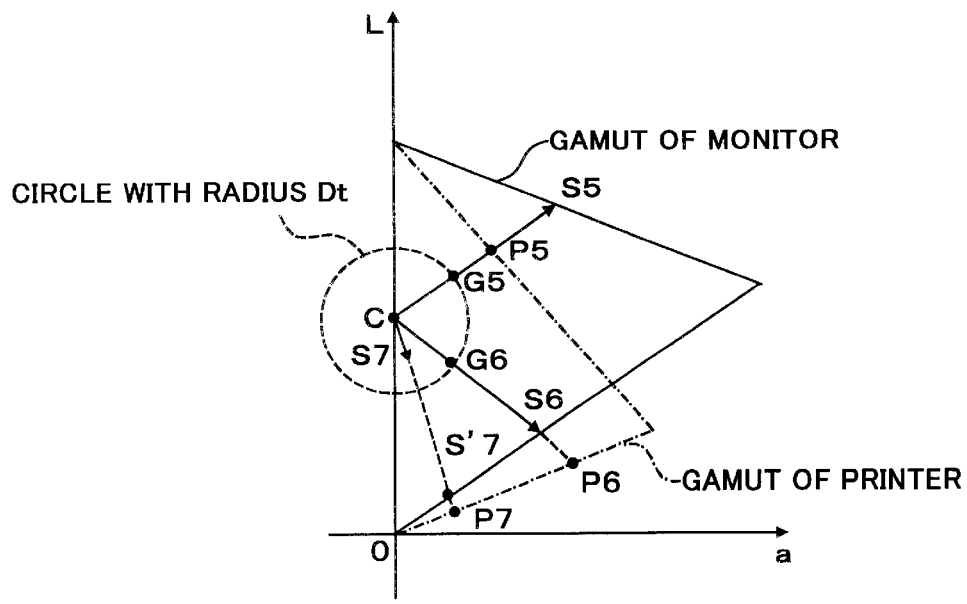
FIG. 11 is an explanatory diagram for color transform executed in the color transform apparatus according to one embodiment of the present invention.

FIG. 11 is an explanatory diagram for the color transform executed in the color transform apparatus according to Embodiment 11.

FIG. 11 illustrates a cross section obtained by cutting the Lab space with a plane containing an L axis and a axis. The gamut of the printer and that of the monitor are illustrated with respective triangles, and the case that a is positive is only illustrated. The dotted line illustrates a circle such that the radius from the center color is Dt.

C is the center color. $S_5$ and $S_6$ are source colors existing on the gamut boundary of the monitor. $S_7$ is a source color existing in the distance Dt from the center color. $S_7'$ is an intersection at which the extended source color vector intersects the gamut boundary of the monitor. $P_5$, $P_6$ and $P_7$ are intersections at which the respective source color vector or extended source color vector intersects the gamut boundary of the printer. Each length of $CS_5$, $CS_6$ and $CS'_7$ corresponds to Dm, and each length of $CP_5$, $CP_6$ and $CP_7$ corresponds to Dp.

$G_5$ and $G_6$ are intersections at which the respective source color vector intersects the circle such that the radius from the center color is Dt.

Then, $S_5$ and $S_6$ are respectively transformed into $P_5$ and $P_6$ with the color transform according to Embodiment 11. Further, segments $CG_6$ and $CG_5$ are not changed, and segments $G_5S_5$ and $G_6S_6$ are respectively transformed into segments $G_5P_5$ and $G_6P_6$ while being compressed or extended linearly.

Accordingly, the source colors in the constant distance from the center color are reproduced accurately with the original color kept, and each color in the gamut of the monitor is transformed into a color in the gamut of the printer in such a way that the entire gamut of the printer is utilized.

In addition, unless colors that can be represented in the printer are quantized, different colors in the monitor are transformed into different colors also in the printer with original gradation kept. Further, the hue expressed with the equation 6 does not vary if the chroma and lightness vary. Accordingly, the color transform apparatus of Embodiment 11 has the function for performing the simplified excellent color transform.

Moreover, although Dt is a fixed value in the color transform apparatus in Embodiment 11, the present invention is not limited to the above case. For example, it may be possible to adopt a value varying depending on the hue and lightness, or a function of Dm or Dp to multiply Dm or Dp by a constant.

Further, although with respect to the color such that the distance from the center color exceeds the threshold value Dt, the coefficient is calculated according to the equation 12 in the color transform apparatus in Embodiment 11, the present invention is not limited to the above case. It may be possible to use other functions satisfying the conditions that 1 is obtained in the case of Ds=Dt, and that Dp/Dm is obtained in the case of Ds=Dm, and for example, the quadratic function satisfying such conditions may be used.

Furthermore, in Embodiment 11, the corresponding program (software) is stored in a computer readable recording medium such as a CD-ROM, downloaded in a RAM of a personal computer, and executed by a CPU of the personal computer, and thereby the CPU operates as source color vector calculator 51, distance calculator 52, gamut distance calculators 53 and 54, coefficient calculator 55 and multiplier 56.

(Embodiment 12)

A color transform apparatus according to Embodiment 12 is explained below.

In addition, in the color transform apparatus according to Embodiment 12, the operation of coefficient calculator 55 is only different from that in the color transform apparatus according to Embodiment 11, and specific explanations of the operations except that of coefficient calculator 55 are omitted. The following description first explains the operation of coefficient calculator 55, and then explains the function of the color transform apparatus according to Embodiment 12, with reference to the drawing.

Coefficient calculator 55 receives the length Ds of the source color vector output from distance calculator 52, the first gamut distance Dp output from gamut distance calculator 53, and the second gamut distance Dm output from gamut distance calculator 54. Assuming that a predetermined threshold Dt is set to be smaller than Dp and Dm, coefficient calculator 55 outputs as a coefficient 1 in the case of Ds<Dt or Dp>Dm.

In the other cases, coefficient calculator 55 outputs as the coefficient Dp/Dm in the case of Ds=Dm, and the value calculated with the equation 12 in the other cases.

The function of the color transform apparatus according to Embodiment 12 is explained below with reference to FIG. 11.

In FIG. 11, $S_5$ is transformed into $P_5$ with the color transform according to Embodiment 12. $S_5$ and $S_6$ are transformed respectively into $P_6$ and $P_7$. Further, segments $CS_6$ and $CS_7$ are not changed, and the segment $G_5S_5$ is linearly compressed to $G_5P_5$.

Accordingly, the source colors in the constant distance from the center color are reproduced accurately with the original color kept. Further, the source color is reproduced accurately with the original color kept also in the case where the gamut of the printer includes the gamut of the monitor.

In the other cases, each color in the gamut of the monitor is transformed into a color in the gamut of the printer in such a way that the entire gamut of the printer is utilized. Then, unless colors that can be represented in the printer are quantized, different colors in the monitor are transformed into different colors also in the printer with original gradation kept. Further, the hue expressed with the equation 6 does not vary if the chroma and lightness vary.

As described above, the color transform apparatus of Embodiment 12 can transform colors out of the gamut of the printer to colors in the gamut thereof without degrading original gradation while reproducing source colors accurately as possible. Accordingly, the color transform apparatus has the function for performing the simplified excellent color transform.

(Embodiment 13)

A color transform apparatus according to Embodiment 13 is explained below.

Figure 12:
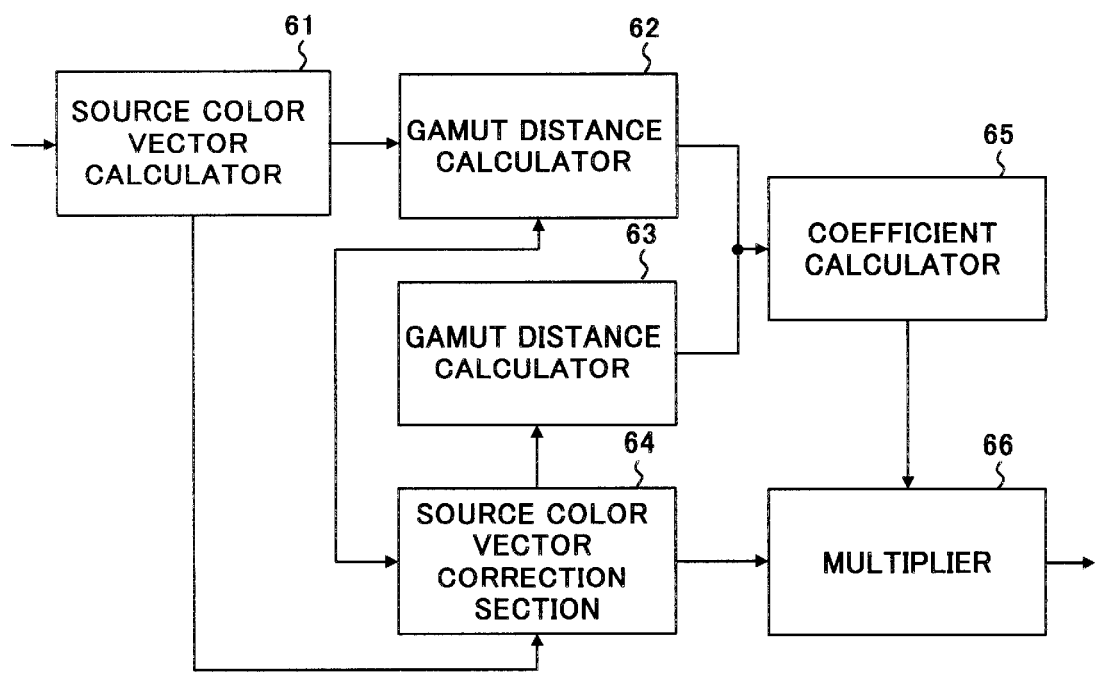
FIG. 12 is a block diagram illustrating a configuration of a color transform apparatus according to one embodiment with a gamut distance calculator that learns using a gamut boundary learning method according to one embodiment of the present invention.

FIG. 12 is a block diagram illustrating a configuration of the color transform apparatus with a gamut distance calculator using the gamut boundary learning method of the present invention.

In Embodiment 13, as in Embodiment 9, the color transform from a monitor to a printer in Lab space is assumed, and it is further assumed to achieve the color transform apparatus by software on a personal computer.

In FIG. 12, source color vector calculator 61 calculates a first source color vector connecting an input source color and a center color with Lab value of (50,0,0) to output.

Gamut distance calculator 62 receives as an input the first source color vector, and calculates the first gamut distance between the center color and an intersection at which the first source color vector or the extended first source color vector intersects the gamut boundary of the printer.

Gamut distance calculator 63 receives as an input the first source color vector, and calculates the second gamut distance between the center color and an intersection at which the fist source color vector or the extended first source color vector intersects the gamut boundary of the monitor.

Source color vector correction section 64 receives as inputs the first source color vector and the first gamut distance, and calculates a second source color vector while correcting the first source color vector.

Coefficient calculator 65 calculates a coefficient from the first gamut distance output from gamut distance calculator 62 and the second gamut distance output from gamut distance calculator 63 to output.

Multiplier 66 multiplies the second source color vector output from source color vector correction section 64 by the coefficient output from coefficient calculator 65, and outputs the resultant as an output of the color transform apparatus.

The operation of the color transform apparatus in Embodiment 13 is explained below.

When the input source color with the Lab value is assumed to be (L, a, b), source color vector calculator 61 calculates the first source color vector ($S_L$, $S_a$, $S_b$) with the equation 10 previously described.

Next, using the first source color vector output from source color vector calculator 61, gamut distance calculator 62 calculates the first gamut distance Dp as a distance between the center color and the intersection at which the first source color vector or the extended first source color vector intersects the gamut boundary of the printer. Gamut distance calculator 62 in Embodiment 13 adopts the same configuration and operation obtained by combining direction cosine calculator 2 and gamut distance calculator 3 in Embodiment 1 of the present invention, and the specific explanation thereof is omitted.

Next, source color vector correction section 64 receives as inputs the first source color vector output from source color vector calculator 61 and the first gamut distance output from gamut distance calculator 62. Then, when $S_L$ is negative, $S_a$ is positive, and $-S_a > S_b$, source color vector correction section 64 calculates the second source color vector ($S'_L$, $S'_a$, $S'_b$) with the following equation 13:

$$S'_L = \frac{\sqrt{S_L^2 + S_a^2 + S_b^2}}{Dp} S_L, \quad S'_a = S_a, \quad S'_b = 1.1 S_b \quad \text{[Eq. 13]}$$

In the cases other than the above case, source color vector correction section 64 outputs $S_L$, $S_a$, and $S_b$ as $S'_L$, $S'_a$, $S'_b$ with no correction performed.

Next, gamut distance calculator 62 receives the second source color vector from source color vector correction section 64, and recalculates the first gamut distance Dp to output to coefficient calculator 65.

At the same time, using the second source color vector output from source color vector correction section 64, gamut distance calculator 63 calculates the second gamut distance Dm that is a distance between the center color and the intersection at which the first source color vector or the extended first source color vector intersects the gamut boundary of the monitor. Gamut distance calculator 63 in Embodiment 13 is comprised of the neural network, and performs the learning with the gamut boundary learning method in Embodiment 4, and therefore the specific explanation thereof is omitted.

Coefficient calculator 65 calculates Dp/Dm to output as a coefficient to output. Multiplier 66 multiplies the second source color vector output from source color vector correction section 62 by Dp/Dm output from coefficient calculator 65, and outputs the resultant as an output of the color transform apparatus.

As described above, in Embodiment 13, the second source color vector is calculated from the gamut distance in the printer corresponding to the first source color vector, and the first source color vector. Then, the target color is obtained in the second source color direction when the color transform simply performed according to the first source color vector direction causes, for example, the hue to vary.

Thereby, it is possible to transform the gamut of the source device so that the gamut of the target device is utilized as much as possible, while reducing the apparent hue variation. Further it is possible to transform a color that cannot be processed in the target device to a color that can be processed therein. Accordingly, it is possible to perform the simplified excellent color transform.

In other words, the color transform apparatus according to Embodiment 13 can obtain the same effects as in the color transform apparatus of Embodiment 9, while reducing the apparent hue variation as well as the color transform apparatus of Embodiment 8.

Further, in Embodiment 13, the corresponding program (software) is stored in a computer readable recording medium such as a CD-ROM, downloaded in a RAM of a personal computer, and executed by a CPU of the personal computer, and thereby the CPU operates as source color distance calculator 61, distance calculator 62, gamut distance calculator 63, source color vector correction section 64, coefficient calculator 65, and multiplier 66.

(Embodiment 14)

A color transform apparatus according to Embodiment 14 is explained below.

Figure 13:
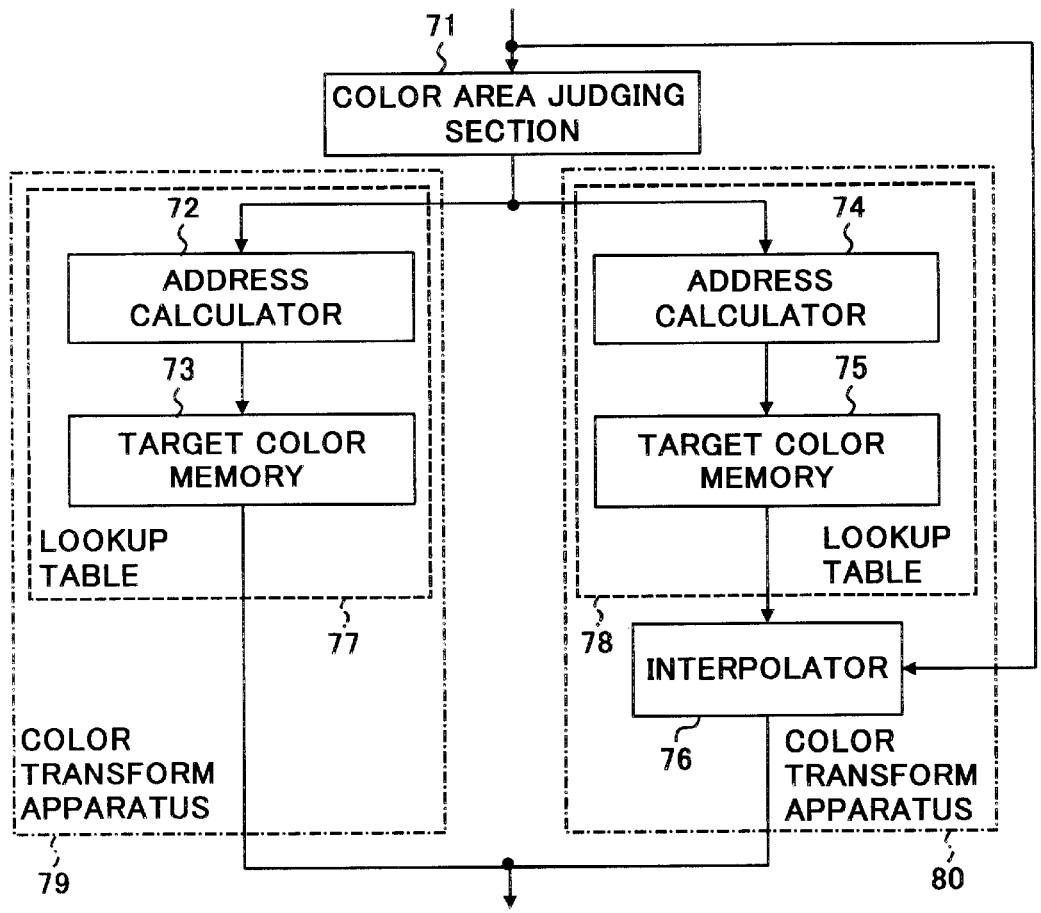
FIG. 13 is a block diagram illustrating a configuration of a color transform apparatus according to one embodiment of the present invention.

FIG. 13 is a block diagram illustrating a configuration of the color transform apparatus according to Embodiment 14.

In Embodiment 14, as in Embodiment 9, the color transform from a monitor to a printer in Lab space is assumed, and it is further assumed to achieve the color transform apparatus by software on a personal computer.

In FIG. 13, color area judging section 71 outputs a source color to address calculator 74 when the chroma of the input source color is equal to or less than a threshold, while outputting the source color to address calculator 72 when the chroma of the input source color exceeds the threshold.

Address calculator 72 retrieves a color that is the closest to the input source color among stored colors, and outputs an address at which a target color corresponding to the retrieved color is stored. Then, target color memory 73 outputs the target color corresponding to the address output from address calculator 72.

Address calculator 74 retrieves two colors that are the most closest to the input source color among stored colors, and outputs two addresses at which target colors corresponding to respective retrieved colors are stored.

Then, target color memory 75 outputs two target colors corresponding to respective addresses output from address calculator 74.

Interpolation section 76 executes interpolation on two target colors input from target color memory 75 with weights obtained from the source color, and outputs the resultant.

In addition, lookup table 77 is comprised of address calculator 72 and target color memory 73, and lookup table 78 is comprised of address calculator 74 and target color memory 75.

Further, color transform apparatus 79 is comprised of lookup table 77. Color transform apparatus 80 is comprised of lookup table 78 and interpolator 80.

The operation of the color transform apparatus according to Embodiment 14 is explained below.

First, with respect to colors corresponding to 4096 groups of Lab values each with lower 4 bits being 0 in every 8 bits, the color transform is performed in advance in the color transform apparatus with the same configuration as that of the color transform apparatus explained in Embodiment 9. Next, obtained target colors are stored in target color memorys 73 and 75, with respective address values each being a value with 12 bits obtained by arranging upper 4 bits containing a code bit in every 8 bits of Lab values in the order of L, a and b.

At the time of operation, when a source color of L,a,b is input, color area judging section 71 calculates the chroma with the equation 6, and outputs the source color to address retrieve section 74 when the chroma is equal to or less than a threshold Ct, while outputting the source color to address retrieve section 72 when the chroma exceeds Ct.

Then, when the chroma of the source color exceeds Ct, address retrieve section 72 outputs as the address value the value with 12 bits obtained by arranging the upper 4 bits of the input source color in the order of L, a and b.

Next, target color memory 73 calculates the target color corresponding to the address value output from address calculator 72, and outputs the target color as an output of the color transform apparatus of Embodiment 14.

Further, when the chroma of the source color is equal to or less than Ct, address calculator 74 outputs the address value 1 that is the value with 12 bits obtained by arranging upper 4 bits of the input source color in the order of L, a and b, and an address value 2 obtained by adding 1 to the upper 4 bits of L value and arranging in the order of L, a and b.

Next, target color memory 75 calculates two target colors corresponding to two respective addresses output from address calculator 74 to output.

Next, interpolator 76 executes weighted average calculation on two target colors output from target color memory 75 using lower 4 bits of L of the source color, and outputs the resultant as an output of the color transform apparatus in Embodiment 14. For example, when lower 4 bits of the source color is 0101, i.e., 5, interpolator 76 multiples the target color corresponding to the address value 1 and the target color corresponding to the address value 2 respectively by weights 6/11 and 5/11 to add, and outputs the resultant.

As described above, color transform apparatus 79 of the color transform apparatus according to Embodiment 14 calculates target colors corresponding to a plurality of source colors with the color transform apparatus of Embodiment 9, and has coding information of the source colors and corresponding target colors as the lookup table. Thereby, it is possible to perform the color transform with high speech using the lookup table without using the color transform apparatus of Embodiment 9 every time. Accordingly, the color transform apparatus of Embodiment 14 has the function for performing the simplified excellent color transform.

In addition, color transform apparatus 80 of the color transform apparatus in Embodiment 14 calculates target colors corresponding to a plurality of source colors with the color transform apparatus of Embodiment 9, and has coding information of the source colors and corresponding target colors as the lookup table. Thereby, it is possible to perform the color transform with high speech using the lookup table without using the color transform apparatus of Embodiment 9 every time. Accordingly, the color transform apparatus of Embodiment 14 has the function for performing the simplified excellent color transform.

Furthermore, in the color transform apparatus in Embodiment 14, when color area judging section 71 judges that the chroma of the source color is high, color transform apparatus 79 with relatively low accuracy calculates the target color. When the chroma of the source color such that the variation is more sensitive in perception is low, color transform apparatus 80 with relatively high accuracy calculates the target color. Thus, it is possible to use the color transform apparatuses corresponding to needed accuracy, and thereby perform the color transform depending on color characteristics. Accordingly, the color transform apparatus of Embodiment 14 has the function for performing the simplified excellent color transform.

In addition, although color area judging section 71 switches the color transform apparatus to be used according to the chroma of the source color in Embodiment 14, the present invention is not limited to the above case. For example, it may be possible to switch the color transform apparatus according to the hue, lightness or a combination thereof. For example, it may be also possible to switch the color transform apparatus according to a predetermined condition such that a lower bit of an input signal is 0 or not 0.

Further, although interpolator 76 calculates two target colors by the weighted average with L values in Embodiment 14, the present invention is not limited to the above case. For example, it may be possible to calculate the weighted average of equal to or more than three target colors, or use the interpolation method with other polynomial.

In addition, in Embodiment 14, the corresponding program (software) is stored in a computer readable recording medium such as a CD-ROM, downloaded in a RAM of a personal computer, and executed by a CPU, and thereby the CPU operates as color area judging section 71, address calculators 72 and 74, and interpolator 76. Further, the RAM of the personal computer is used as target color memorys 73 and 75.

(Embodiment 15)

A gamut judging apparatus according to Embodiment 15 is explained below.

Figure 14:
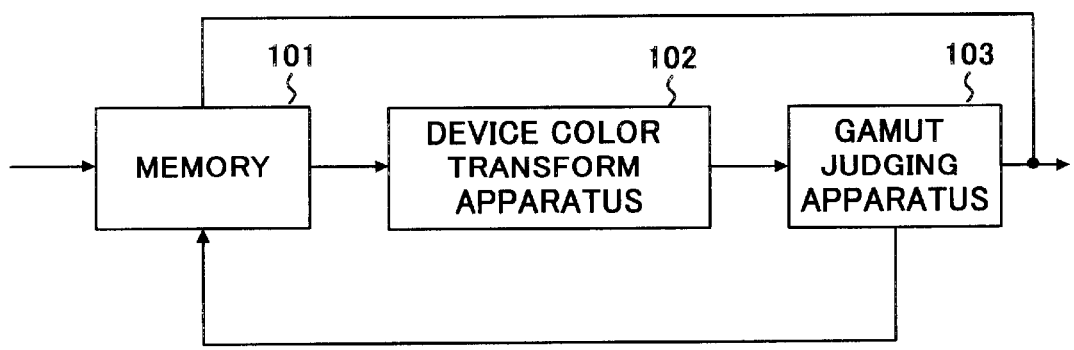
FIG. 14 is a block diagram illustrating a configuration of a gamut judging apparatus according to one embodiment of the present invention.

FIG. 14 is a block diagram illustrating a configuration of the gamut judging apparatus of the present invention. In Embodiment 15, as in Embodiment 1, the color transform from a monitor to a printer in Lab space is assumed, and it is further assumed to achieve the gamut judging apparatus by software on a personal computer.

In FIG. 14, memory 101 is a memory that stores an input signal of the monitor and one item of information indicating whether a color corresponding to the input signal is in or out of the gamut of the printer. Device color transform apparatus 102 is a device color transform apparatus that transforms the input signal of the monitor to a source color with Lab value in the monitor corresponding to the input signal. Gamut judging section 103 is a gamut judging apparatus that judges whether the source color represented with the Lab value is in or out of the gamut of the printer.

The operation of the gamut judging apparatus according to Embodiment 15 is explained below.

When the input signal of the monitor for the gamut judgment is input to memory 101, memory 101 examines whether the received input signal is the same as the stored input signal. When the signals are the same, memory 101 outputs the gamut judgment result corresponding to the signals as an output of the gamut judging apparatus, and finishes the operation.

On the other hand, when the received input signal is different from the stored input signal, memory 101 stores the input signal, and outputs the input signal to device color transform apparatus 102. Device color transform apparatus 102 calculates the Lab value of the color displayed on the monitor screen when the input signal is input, using the received input signal of the monitor, and outputs the resultant as a source color.

In addition, device color transform apparatus 102 is achieved with a lookup table and interpolator in Embodiment 15.

Next, gamut judging apparatus 103 judges whether the source color output from device color transform apparatus 102 is in or out of the gamut of the printer, and outputs the result as an output of the gamut judging apparatus of Embodiment 15.

Further, the judgment result is input to memory 101. Storage section 101 stores the judgment result while pairing with the input signal first stored, and the gamut judging apparatus of Embodiment 15 finishes the operation.

In addition, device color transform apparatus 102 has the same configuration and operation as in Embodiment 1, and the specific explanation thereof is omitted.

As described above, the gamut judging apparatus of Embodiment 15 uses the judgment result stored in the memory with respect to the input signal of the monitor once subjected to the gamut judgment, and thereby can reduce processing time required in gamut judging apparatus 103. Thus, it is possible for the gamut judging apparatus to have the function for performing the simplified excellent gamut judgment.

In addition, although the memory stores a pair of the input signal of the monitor and the judgment result thereof in Embodiment 15, the present invention is not limited to the above case. For example, it may by possible to store a plurality of pairs, while deleting in the order from least to most recent. Also it may be possible to store a plurality of pairs and further store the used frequencies thereof, while deleting in ascending order of used frequency to update the used frequency.

Further, in Embodiment 15, the corresponding program (software) is stored in a computer readable recording medium such as a CD-ROM, downloaded in a RAM of a personal computer, and executed by a CPU of the personal computer, and thereby the CPU operates as device color transform apparatus 102 and gamut judging apparatus 103. Furthermore, the RAM of the personal computer is used as memory 101.

(Embodiment 16)

A color transform apparatus according to Embodiment 16 is explained below.

Figure 15:
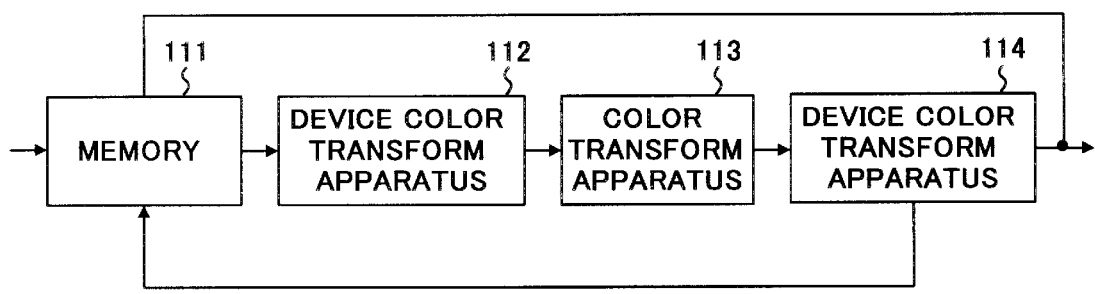
FIG. 15 is a block diagram illustrating a configuration of a color transform apparatus according to one embodiment of the present invention.

FIG. 15 is a block diagram illustrating a configuration of the color transform apparatus of the present invention. In Embodiment 16, as in Embodiment 9, the color transform from a monitor to a printer in Lab space is assumed, and it is further assumed to achieve the color transform apparatus by software on a personal computer.

In FIG. 15, memory 111 is a memory that stores a pair of an input signal of the monitor and an input signal of the printer corresponding to a target color obtained by transforming a source color corresponding to the input signal of the monitor into a color in the gamut of the printer.

Device color transform apparatus 112 is a device color transform apparatus that transforms the input signal of the monitor into a source color with Lab value in the monitor corresponding to the input signal of the monitor.

Color transform apparatus 113 is a color transform apparatus that transforms the source color in the gamut of the monitor into a color in the gamut of the printer.

Device color transform apparatus 114 is a device color transform apparatus that transforms the target color represented with the Lab value in the gamut of the printer into the input signal for the printer.

In addition, in Embodiment 16, device color transform apparatuses 112 and 114 each is comprised of a lookup table and interpolator, and color transform apparatus 113 is configured in the same way as the color transform apparatus according to Embodiment 9.

The operation of the color transform apparatus according to Embodiment 16 is explained below.

When the input signal of the monitor for the gamut judgment is input to memory 111, memory 111 examines whether the received input signal is the same as the stored input signal of the monitor. When the signals are the same, memory 111 outputs the input signal of the printer corresponding to the signals as an output of the color transform apparatus according to Embodiment 16, and finishes the operation.

When the received input signal is different from the stored input signal of the monitor, memory 111 stores the received input signal of the monitor, and inputs the received input signal to device color transform apparatus 112.

Device color transform apparatus 112 transforms the received input signal of the monitor into the source color with the Lab value in the monitor corresponding to the received input signal to input to color transform apparatus 113.

Color transform apparatus 113 transforms the input source color in the gamut of the monitor into a target color in the gamut of the printer to input to device color transform apparatus 114.

Device color transform apparatus 114 transforms the input target color in the gamut of the printer into an input signal for the printer corresponding to the input target color, and outputs the input signal for the printer as an output of the color transform apparatus according to Embodiment 16 while storing the input signal in memory 111.

Finally, memory 111 stores the received input signal for the printer while paring with the input signal of the monitor previously stored, and the operation of the color transform apparatus according to Embodiment 16 finishes.

As described above, the color transform apparatus according to Embodiment 16 outputs the input signal for the printer stored in the memory with respect to the input signal of the monitor that is once subjected to the color transform, and thereby can reduce processing time required in color transform apparatus 114. Thus, it is possible for the color transform apparatus to have the function for performing the simplified excellent gamut judgment.

In addition, in Embodiment 16, the corresponding program (software) is stored in a computer readable recording medium such as a CD-ROM, downloaded in a RAM of a personal computer, and executed by a CPU of the personal computer, and thereby the CPU operates as device color transform apparatuses 112 and 114, and gamut judging apparatus 113. Further, the RAM of the personal computer is used as memory 111.

The present invention is not limited to the above described embodiments, and various variations and modifications may be possible without departing from the scope of the present invention.

This application is based on the Japanese Patent Application No.HEI11-101656 filed on Apr. 8, 1999, entire content of which is expressly incorporated by reference herein.

What is claimed is:

1. A color transform apparatus comprising:
   a source color vector calculator that is configured to calculate a source color vector connecting a center color set in gamut common to a first device and a source color in the gamut of the second device;
   a first gamut distance calculator that is configured to calculate a first gamut distance between said center color and an intersection at which said source color vector or an extended source color vector intersects the gamut of said first device; and
   a second gamut distance calculator that is configured to calculate a second gamut distance between said center color and an intersection at which said source color vector or an extended source color vector intersects the gamut of second first device;
   wherein a target color in said first device is set to a color corresponding to a vector obtained by multiplying the source color vector calculated in said source color vector calculator by a coefficient calculated from said first gamut distance and second gamut distance.

2. The apparatus according to claim 1, wherein said coefficient calculated from said first gamut distance and second gamut distance is a value obtained by dividing said first gamut distance by said second gamut distance.

3. The apparatus according to claim 1, wherein said coefficient calculated from said first gamut distance and second gamut distance is 1 in the case where said first gamut distance is larger than said second gamut distance, and is a value obtained by dividing said first gamut distance by said second gamut distance in the case where said first gamut distance is smaller than said second gamut distance.

4. The apparatus according to claim 3, wherein said coefficient calculated from said first gamut distance and second gamut distance is 1 in the case where a distance between said source color and said center color is within threshold.

5. The apparatus according to claim 1, wherein said coefficient calculated from said first gamut distance and second gamut distance is 1 in the case where a distance between said source color and said center color is within a threshold, is a value obtained by dividing said first gamut distance by said second gamut distance in the case where said source color is on the gamut boundary of said second device, and is a value between 1 and the value obtained by dividing said first gamut distance by said second gamut distance in other cases.

6. The apparatus according to claim 1, wherein at least one of said first gamut distance calculator and said second gamut distance calculator is configured to use results obtained by a gamut boundary learning method.

7. The apparatus according to claim 1, wherein at least one of said first gamut distance calculator and said second gamut distance calculator calculates a gamut distance using a direction cosine of said source color vector.

8. The apparatus according to claim 7, wherein at least one of said first gamut distance calculator and said second gamut distance calculator is comprised of a neural network or a lookup table with the direction cosine of said source color vector as an input and said gamut distance as an output.

9. The apparatus according to claim 1, wherein said color transform apparatus calculates said first gamut distance corresponding to said source color, calculates a second source color vector using said first gamut distance and said source color vector, sets said source color vector as a new source color, and then performs color transform.

* * * * *

UNITED STATES PATENT AND TRADEMARK OFFICE
CERTIFICATE OF CORRECTION

PATENT NO. : 6,819,458 B1
DATED : November 16, 2004
INVENTOR(S) : T. Tanaka et al.

It is certified that error appears in the above-identified patent and that said Letters Patent is hereby corrected as shown below:

Column 30,
Line 15, after "within" insert -- a --.

Signed and Sealed this

Twenty-first Day of June, 2005

JON W. DUDAS
*Director of the United States Patent and Trademark Office*